United States Patent
Imanishi et al.

(10) Patent No.: US 12,020,871 B2
(45) Date of Patent: Jun. 25, 2024

(54) POLYPROPYLENE FILM, METAL LAYER LAMINATED FILM USING SAME, AND FILM CAPACITOR

(71) Applicant: Toray Industries, Inc., Tokyo (JP)

(72) Inventors: Yasuyuki Imanishi, Otsu (JP); Masatoshi Ohkura, Otsu (JP); Yuta Nakanishi, Otsu (JP)

(73) Assignee: Toray Industries, Inc., Tokyo (JP)

( * ) Notice: Subject to any disclaimer, the term of this patent is extended or adjusted under 35 U.S.C. 154(b) by 88 days.

(21) Appl. No.: 17/799,322

(22) PCT Filed: Feb. 18, 2021

(86) PCT No.: PCT/JP2021/006082
§ 371 (c)(1),
(2) Date: Aug. 12, 2022

(87) PCT Pub. No.: WO2021/166994
PCT Pub. Date: Aug. 26, 2021

(65) Prior Publication Data
US 2023/0080437 A1    Mar. 16, 2023

(30) Foreign Application Priority Data
Feb. 21, 2020   (JP) .................. 2020-027899

(51) Int. Cl.
| | | |
|---|---|---|
| H01G 4/33 | (2006.01) | |
| H01G 4/18 | (2006.01) | |
| H01G 4/32 | (2006.01) | |
| C08J 5/18 | (2006.01) | |

(52) U.S. Cl.
CPC .............. *H01G 4/33* (2013.01); *H01G 4/18* (2013.01); *H01G 4/32* (2013.01); *C08J 5/18* (2013.01)

(58) Field of Classification Search
None
See application file for complete search history.

(56) References Cited

U.S. PATENT DOCUMENTS

2003/0195299 A1 * 10/2003 Stevens ............ C08F 210/06
                                                          525/240
2018/0208751 A1    7/2018 Tanike et al.

2020/0198298 A1    6/2020 Imanishi et al.
2021/0380769 A1   12/2021 Imanishi et al.
2022/0135780 A1    5/2022 Imanishi et al.

FOREIGN PATENT DOCUMENTS

| | | | |
|---|---|---|---|
| EP | 2 977 398 A1 | 1/2016 | |
| EP | 3 296 348 A1 | 3/2018 | |
| EP | 3 604 403 A1 | 2/2020 | |
| JP | 2016033211 A | 3/2016 | |
| JP | 2019172921 A | 10/2019 | |
| WO | WO-2006069205 A1 * | 6/2006 | ........... C08F 10/00 |
| WO | 2016002281 A1 | 1/2016 | |
| WO | 2016043172 A1 | 3/2016 | |
| WO | 2016182003 A1 | 11/2016 | |
| WO | 2017221985 A1 | 12/2017 | |
| WO | 2019044758 A1 | 3/2019 | |
| WO | 2020040127 A1 | 2/2020 | |
| WO | 2020171163 A1 | 8/2020 | |

OTHER PUBLICATIONS

International Search Report and Written Opinion for International Application No. PCT/JP2021/006082, dated May 18, 2021, 5 pages.
Kawai, M., "Film Capacitor Breakthrough, from Car to Energy", Nikkei Electronics (Japan), Nikkei Business Publication, Inc., Sep. 17, 2012, 8 pages, with partial English translation.
The extended European Search Report issued Feb. 12, 2024, by the European Patent Office in corresponding European Patent Application No. 21757796.4-1102. (10 pages).

* cited by examiner

*Primary Examiner* — Eric W Thomas
(74) *Attorney, Agent, or Firm* — Buchanan Ingersoll & Rooney PC

(57) ABSTRACT

A polypropylene film in which: during a heating process in thermomechanical analysis (TMA), the relationship (Ts−Tf) ≤40° C. is satisfied by the temperature (Ts) (° C.) at which the film contracts by 0.1% in the longitudinal direction and the temperature (Tf) (° C.) at which the longitudinal shrink stress reaches 0.01 MPa; and the skewness (Ssk), which is the degree of bias of the protrusion shape, of at least one surface of the film is greater than −30 and less than 5. Thus provided is a polypropylene film that has excellent reliability and withstand voltage characteristics in high temperature environments when used in high voltage capacitors, that has a structure with excellent stability against heat and is suitable for applications in capacitors or the like to be used at high temperatures and high voltages, and that has excellent processability and does not wrinkle during a conveyance process including a vapor deposition process.

9 Claims, No Drawings

POLYPROPYLENE FILM, METAL LAYER LAMINATED FILM USING SAME, AND FILM CAPACITOR

CROSS REFERENCE TO RELATED APPLICATIONS

This is the U.S. National Phase application of PCT/JP2021/006082, filed Feb. 18, 2021, which claims priority to Japanese Patent Application No. 2020-027899, filed Feb. 21, 2020, the disclosures of each of these applications being incorporated herein by reference in their entireties for all purposes.

FIELD OF THE INVENTION

The present invention particularly relates to a polypropylene film suitably used for capacitor applications.

BACKGROUND OF THE INVENTION

Since polypropylene films are excellent in transparency, mechanical properties, electrical properties, and the like, polypropylene films have been used in various applications such as packaging applications, tape applications, and electrical applications including cable wrapping and capacitors.

Among them, in capacitor applications, the polypropylene film is particularly preferably used not only for direct current and alternating current but also for high voltage capacitors due to the excellent voltage resistance and low loss characteristics thereof.

Recently, various electric devices have been inverterized, and accordingly, demands for miniaturization and capacity enlargement of capacitors have been further increased. In response to such a demand, particularly from automobile applications (including hybrid car applications), solar power generation, and wind power generation applications, the polypropylene film has been required to have a reduced film thickness, improved dielectric breakdown voltage, and excellent reliability capable of maintaining characteristics in long-term use in a high temperature environment.

The polypropylene film has been considered to have high heat resistance and high dielectric breakdown voltage among polyolefin-based films. On the other hand, in application to the above-mentioned fields, it is important to exhibit excellent dimensional stability at a use environmental temperature and stable performance as electrical performance such as electrical resistance even in a region 10° C. to 20° C. higher than the use environmental temperature. Here, from the viewpoint of the heat resistance, when considering power semiconductor applications using silicon carbide (SiC) in the future, the use environmental temperature is expected to be higher. From the demand for higher heat resistance and higher voltage resistance as a capacitor, the improvement of a dielectric breakdown voltage of a film under a high temperature environment exceeding 110° C. is required. However, as disclosed in Non-Patent Document 1, the upper limit of operating temperature of the polypropylene film is said to be about 110° C., and it is extremely difficult to stably maintain the dielectric breakdown voltage under such a temperature environment.

In addition, even in the process of vapor deposition processing of the film, the orientation of the film may be relaxed by receiving a thermal history due to radiant heat, and thus it is difficult for a film that is unstable to heat to sufficiently exhibit the voltage resistance performance originally possessed by the film as a capacitor.

As a method for obtaining excellent performance in a high temperature environment when a polypropylene film is made into a thin film and is used as a capacitor, for example, there have been proposed a film in which capacitor characteristics and reliability at a high temperature are improved by controlling stress at an elongation of 50% in a longitudinal direction at 125° C. (for example, Patent Document 1), and a film in which stretchability is improved by adding a melt-type nucleating agent to polypropylene having a high melting point to improve mechanical strength of a film at 125° C. (for example, Patent Document 2). Further, there have been proposed a film in which a highly stereoregular polypropylene raw material is melt-extruded and then rapidly cooled, thereby forming a mesomorphic phase on a cast sheet to improve the degree of crystal orientation of the film (for example, Patent Document 3), and a polypropylene film in which fine protrusions are formed on the film surface by using polypropylene raw materials having different viscosities to improve the processability at the time of producing a capacitor element and the voltage resistance and reliability in a high temperature environment. (For example, Patent Document 4) Furthermore, it has been proposed that the dielectric breakdown strength is improved by using a polypropylene raw material having a strain hardening parameter within a certain range. (See, for example, Patent Document 5.)

PATENT DOCUMENTS

Patent Document 1: Japanese Patent Laid-open Publication No. 2016-033211
Patent Document 2: International Publication No. 2016/043172
Patent Document 3: International Publication No. 2016/182003
Patent Document 4: Japanese Patent Laid-open Publication No. 2019-172921
Patent Document 5: International Publication No. 2017/221985

Non-Patent Document

Non-Patent Document 1: MOTONOBU KAWAI: "Film Capacitor Breakthrough, from Car to Energy", NIKKEI ELECTRONICS, Nikkei Business Publications, Inc., 17 Sep. 2012, pages 57-62

SUMMARY OF THE INVENTION

The polypropylene films described in Patent Documents 1 to 3 all have, however, dielectric breakdown voltages improved insufficiently under high temperature environments in excess of 110° C., and moreover, the withstand voltages in the case of use as a capacitor and reliability under high temperature environments are considered far from sufficient. Furthermore, in the polypropylene film described in Patent Document 4, the protrusion height of the film is not sufficient, wrinkles may occur particularly in a vapor deposition process, and reliability may deteriorate when the film is formed into a capacitor. Furthermore, the polypropylene film described in Patent Document 5 is not supposed to be used in a high temperature environment, and the withstand voltage and reliability of the capacitor may be impaired in a temperature range exceeding 110° C.

Therefore, an object of the present invention is to provide a polypropylene film that is excellent in withstand voltage characteristics and reliability in a high temperature environment, has a structure excellent in stability against heat and is suitable for capacitor applications and the like used under high temperature and high voltage, is less likely to wrinkle in a conveyance process including a vapor deposition process, and is excellent in processability and to provide a metal membrane layered film and a film capacitor using the polypropylene film.

The present inventors have conducted intensive studies in order to solve the above problems and achieved the following present invention. The present invention according to various embodiments is a polypropylene film in which: in a heating process in thermomechanical analysis (TMA), the relationship (Ts−Tf)≤40° C. is satisfied by the temperature (Ts) (° C.) at which the film contracts by 0.1% in the longitudinal direction and the temperature (Tf) (° C.) at which the longitudinal shrink stress reaches 0.01 MPa; and the skewness (Ssk), which is the degree of bias of the protrusion shape, of at least one surface of the film is greater than −30 and less than 5.

According to the present invention, there is provided a polypropylene film that is excellent in withstand voltage characteristics and reliability in a high temperature environment, is suitable for capacitor applications and the like used under high temperature and high voltage, is excellent in structural stability against heat, and is less likely to wrinkle in a conveyance process including a vapor deposition process. In addition, a metal layer laminated film and a film capacitor using the same are provided.

DETAILED DESCRIPTION OF EMBODIMENTS OF THE INVENTION

The present inventors have intensively studied to solve the above-mentioned problems and considered the reason why the polypropylene films disclosed in Patent Documents 1 to 5 have insufficient dielectric breakdown voltages in high temperature environments and insufficient withstand voltage characteristics, reliability, and processability in high temperature environments when used as a capacitor as follows.

That is, it can be said that the polypropylene films disclosed in Patent Document 1 and Patent Document 2 have sufficient voltage resistance and reliability in an environment at 105° C. as a capacitor, but when considering voltage resistance in a further high temperature environment, it is considered that a stretch ratio, heat treatment, and fixing of the orientation and structure of molecular chains in film formation are not necessarily sufficient, and there is the problem that the orientation of amorphous chains of the film is relaxed at a higher temperature, and a withstand voltage is lowered. Also in Patent Document 3, considering voltage resistance in a high temperature environment, preheating and heat treatment at the time of transverse stretching in film formation are not necessarily sufficient, and slow cooling treatment is not performed at a heat treatment temperature after transverse stretching. Therefore, it has been considered that a dielectric breakdown voltage at a high temperature may be lowered because a large amount of a movable amorphous component is present in the film, and sufficient lubricity may not be obtained because the surface of the polypropylene film described in Patent Document 4 is smooth. It has been considered that there is a problem that blending a polypropylene raw material having a low MFR causes generation of a gel to cause a decrease in the withstand voltage, or the film may be broken during film formation due to the gel serving as a starting point. The polypropylene film in Patent Document 5 contains a polypropylene raw material having a strain hardening property within a certain range, but since there is no idea of controlling the structure of the film by optimizing the stretching conditions during film formation, the orientation of molecular chains and the fixing of the structure are not necessarily sufficient, and it has been considered that there is the problem that the orientation of amorphous chains is relaxed under a high temperature environment, and the withstand voltage may be lowered.

Based on the above considerations, the present inventors have further studied and found that the above problems can be solved by providing a film in which a difference between a temperature (Ts) (° C.) at which the film contracts by 0.1% in the longitudinal direction and a temperature (Tf) (° C.) at which the longitudinal shrink stress reaches 0.01 MPa in thermomechanical analysis (TMA) is equal to or less than a certain value, and the degree of bias of the protrusion shape of at least one surface of the film is within a certain range.

That is, an embodiment of the present invention is a polypropylene film in which: in a heating process in thermomechanical analysis (TMA), the relationship (Ts−Tf) ≤40° C. is satisfied by the temperature (Ts) (° C.) at which the film contracts by 0.1% in the longitudinal direction and the temperature (Tf) (° C.) at which the longitudinal shrink stress reaches 0.01 MPa; and the skewness (Ssk), which is the degree of bias of the protrusion shape, of at least one surface of the film is greater than −30 and less than 5.

In the specification, the polypropylene film may be simply referred to as a film. Since the polypropylene film of the present invention is not a microporous film, it does not have a large number of pores. That is, the polypropylene film according to embodiments of the present invention means a polypropylene film other than the microporous film. Here, the microporous film is defined as a film having a pore structure that penetrates both surfaces of the film and has air permeability of 5,000 seconds/100 ml or less at a permeation time of 100 ml of air at 23° C. and a relative humidity of 65% using a B-type Gurley tester of JIS P 8117 (1998).

In the polypropylene film according to an embodiment of the present invention, in a heating process in thermomechanical analysis (TMA), it is necessary that the relationship (Ts−Tf)≤40° C. be satisfied by the temperature (Ts) (° C.) at which the film contracts by 0.1% in the longitudinal direction and the temperature (Tf) (° C.) at which the longitudinal shrink stress reaches 0.01 MPa and that the skewness (Ssk), which is the degree of bias of the protrusion shape, of at least one surface of the film be greater than −30 and less than 5.

That is, the present inventors have intensively studied to obtain a polypropylene film exhibiting excellent withstand voltage characteristics and reliability under a high temperature environment and processability in capacitor applications and found that the relational expression has a high correlation with the withstand voltage characteristics and reliability of the capacitor under a high temperature environment and that the degree of bias of protrusions on the film surface affects the processability of the film. In order to obtain a polypropylene film capable of exhibiting long-term reliability in a high temperature environment in capacitor applications, it has been found that it is important to perform control so that (Ts) (° C.) and (Tf) (° C.) will satisfy the above relational expression and (Ssk) will be within a certain range, particularly in capacitor withstand voltage characteristics, long-term reliability, and processability in a high temperature environment, resulting in the present invention.

Here, in a heating process in thermomechanical analysis (TMA), the fact that the temperature (Ts) (° C.) at which the film contracts by 0.1% in the longitudinal direction and the temperature (Tf) (° C.) at which the longitudinal shrink stress reaches 0.01 MPa satisfy the relationship of (Ts−Tf) ≤40° C. suggests that the film has a small structural change even when heated and means that the film has a very stable structure particularly in a high temperature environment. The value of (Ts−Tf) is preferably 30° C. or lower, more preferably 20° C. or lower, most preferably 10° C. or lower. As this value is lower, the dielectric breakdown voltage is higher even at a high temperature, and the capacitor can exhibit superior reliability in a high temperature environment.

In order to satisfy (Ts−Tf)≤40° C., as described later, for example, a raw material having a high meso-pentad fraction and a cold xylene soluble component (CXS) of less than 3.0% by mass is used as a polypropylene raw material (A) (also referred to as a polypropylene resin (A). The same applies to a polypropylene raw material (B) and a polypropylene raw material (C) described later), preliminary stretching of 1.01 to 1.10 times is performed before stretching in the longitudinal direction, an area stretch ratio is set to 65 times or more during biaxial stretching and a stretch ratio in the width direction is set to 11.0 times or more, and in heat set treatment and relaxation treatment steps after the biaxial stretching, first, a relaxation treatment is performed while heat treatment (first stage) at a temperature lower than the stretching temperature in the width direction is performed, and subsequently, the film can be obtained by appropriately subjecting the film to a multi-stage heat fixation treatment and a relaxation treatment in which a heat treatment (second stage) is performed at a temperature lower than the first stage heat treatment temperature and 135° C. or higher, and a heat treatment (third stage) is further performed at 80° C. or higher and lower than the second stage heat treatment temperature while maintaining tension in the width direction.

On the other hand, when (Ts−Tf) is higher than 40° C., when the film is used as a capacitor under a high temperature environment where a high voltage is applied, particularly when the film is placed in a high temperature state for a long time, molecular chain relaxation of the film proceeds to lower the withstand voltage, so that capacitor capacitance reduction, short-circuit breakdown, and the like occur, resulting in a capacitor with poor reliability. The lower limit of the above relational expression (Ts−Tf) is preferably 0° C.

Here, in the polypropylene film of the present invention, the "longitudinal direction" is a direction corresponding to the flow direction in a film producing step (hereinafter sometimes referred to as "MD"), and the "width direction" is a direction orthogonal to the flow direction in the film production process (hereinafter sometimes referred to as "TD"). When the film sample has a shape such as a reel or a roll, it can be said that a film winding direction is the longitudinal direction. On the other hand, in the case of a film in which it is unknown which direction corresponds to the flow direction in the film production process from the appearance of the film, a slit-shaped film piece is sampled, the breaking strength is obtained with a tensile tester, a direction in which the maximum breaking strength is given is regarded as a film width direction, and a direction orthogonal to the film width direction is regarded as a longitudinal direction. Although details will be described later, when the width of the sample is less than 50 mm and the breaking strength cannot be obtained by a tensile tester, the crystal orientation of a crystal (110) plane of the polypropylene film by wide-angle X-ray is measured as follows and defined as the film longitudinal direction and the film width direction based on the following criteria. That is, an X-ray (CuKα ray) is incident in a direction perpendicular to a film surface, a crystal peak at 2θ=about 14° (α crystal (110) plane) is scanned in a circumferential direction, a direction in which the diffraction intensity of the obtained diffraction intensity distribution is the highest is defined as a film width direction, and a direction orthogonal thereto is defined as a longitudinal direction.

The polypropylene film according to the present invention has a skewness (Ssk), which is the degree of bias of the surface protrusion shape, on at least one surface of more than −30 and less than 5 to exhibit a high dielectric breakdown voltage even under high temperature environments and to exhibit, as a capacitor, voltage resistance and reliability even under high temperature environments. Here, Ssk is a parameter indicating the degree of bias of unevenness on the surface. The degree of bias Ssk represents the cubic mean of Z (x,y) on a reference surface made dimensionless by the cube of the root mean square height Sq and means the skewness, which is a numerical value representing the symmetry of mountain parts and valley parts centered on the average surface. Therefore, when the degree of bias Ssk<0, it means that the surface is biased downward with respect to the average line, that is, there are more concave valley parts than convex mountain parts. On the other hand, when Ssk>0, it means that the surface is biased upward with respect to the average line, that is, there are more convex mountain parts than concave valley parts. When the degree of bias Ssk=0, it means a symmetric state (normal distribution) with respect to the average line. The present inventors have extensively conducted studies and resultantly found that a surface can be controlled such that the surface imparts lubricity to the film using convex mountain parts while valley parts of recesses having a locally reduced thickness, which are considered to be a cause of a decrease in withstand voltage of the surface of the polypropylene film, is appropriately reduced.

By appropriately forming the mountain parts, slipperiness between the films or between the film and a conveyance roll is developed, and by controlling the valley parts to an appropriate ratio, it is possible to suppress the low-voltage breakdown, to raise the withstand voltage, and to further improve the self-healing property of the capacitor element. By performing the above-mentioned surface control, processability at the time of producing a capacitor element is improved, uniformity of an interlayer gap between the film and the film can be developed when the film is wound or laminated into a capacitor, and in particular, in applications of capacitors for high voltage, the voltage resistance and reliability in a high temperature environment can be obtained.

From the above viewpoint, the upper limit value of (Ssk) is preferably 4, more preferably 3, and the lower limit value of (Ssk) is preferably −28, more preferably −26.

When the degree of bias (Ssk) is −30 or less, many shapes having recesses on the film surface are deviated, and particularly in applications of capacitors for high voltage, the voltage resistance in a high temperature environment may be impaired, or the lubricity of the film may be impaired and the processability may be deteriorated. On the other hand, even in a case where the degree of bias (Ssk) is 5 or more, the shape of the convex portion is excessively present on the film surface, and when the film is formed into a capacitor, an interlayer gap between the film and the film is generated to cause a decrease in capacity in a high temperature environment, thereby impairing reliability, or lubricity of the film may be impaired to deteriorate the voltage resistance.

The degree of bias (Ssk) of the surface protrusion shape of the polypropylene film of the present invention can be controlled to fall within the above-mentioned range by, for example, using the polypropylene raw material (B) having preferable characteristics to be described later, setting the area stretch ratio to 65 times or more during biaxial stretching and the stretch ratio in the width direction to 11.0 times or more, and controlling the casting drum temperature, the melting peak temperature (Tm) (° C.) of the film, and the crystallization peak temperature (Tc) (° C.) to fall within preferable ranges.

In the polypropylene film of the present invention, the meso-pentad fraction of the film is preferably 0.970 or more. The meso-pentad fraction is more preferably 0.975 or more, still more preferably 0.981 or more.

The meso-pentad fraction is an index indicating stereo-regularity of a crystal phase of polypropylene measured by a nuclear magnetic resonance method (NMR method), and in the present invention, the meso-pentad fraction is preferably 0.970 or more to impart a high degree of crystallinity, a high melting point, and an ability of improving a dielectric breakdown voltage in a high temperature environment. The upper limit of the meso-pentad fraction is not particularly limited. In the present invention, the polypropylene resin having a high meso-pentad fraction is particularly preferably produced with what is called a Ziegler-Natta catalyst, and a method of appropriately selecting an electron donating component in the catalyst or the like is preferably employed. The polypropylene resin obtained thereby can have a molecular weight distribution (Mw/Mn) of 3.0 or more and a <2,1> erythro site defect of 0.1 mol % or less, and it is preferable to use such a polypropylene resin.

In the polypropylene film of the present invention, the temperature (Ts) (° C.) at which the film contracts by 0.1% in the longitudinal direction in the heating process in TMA is preferably 100° C. or higher. The temperature is more preferably 120° C. or higher, still more preferably 140° C. or higher. When (Ts) (° C.) satisfies 100° C. or higher, molecular chains are less likely to shrink even in a high temperature environment of 100° C. or higher, and thus, for example, in a capacitor production process in which a thermal history is received during conveyance, the film is less likely to wrinkle, so that processability can be improved. When (Ts) (° C.) is lower than 100° C., wrinkles may be formed in the vapor deposition process, or the high-temperature withstand voltage and reliability may be poor. The upper limit value of (Ts) (° C.) is not particularly limited, but it is practical to set it to 160° C.

In the polypropylene film of the present invention, the temperature (Tf) (° C.) at which the longitudinal shrink stress reaches 0.01 MPa in the heating process in TMA is preferably 100° C. or higher. The temperature is more preferably 110° C. or higher, still more preferably 120° C. or higher, particularly preferably 130° C. or higher.

When (Tf) (° C.) satisfies 100° C. or higher, the shrinkage of the film can be suppressed by heat in a capacitor production process and a using process, and since an element is unlikely to be strongly wound and fastened, a self-healing function (self-healing) operates by holding an appropriate gap between film layers, penetrating short-circuit breakdown accompanied by rapid capacity reduction can be suppressed, the reliability as a capacitor can be enhanced, and the dielectric breakdown voltage can be enhanced because molecular chains in the structure are unlikely to be relaxed. The upper limit value of (Tf) (° C.) is not particularly limited, but it is practical to set it to 160° C. If the temperature (Tf) (° C.) is to be increased to higher than 160° C., the orientation of the amorphous region of the film is increased to the utmost limit, so that film breakage may easily occur.

Examples of a method for setting (Tf) (° C.) to 100° C. or higher or in the above preferable range include a method in which a raw material having a high meso-pentad fraction and a cold xylene soluble component (CXS) of less than 3.0% by mass is used as the polypropylene raw material (A) to increase the ratio of a component having a relatively high melting point in the polypropylene film, preliminary stretching of 1.01 to 1.10 times is performed before stretching in the longitudinal direction at a casting drum temperature of 60 to 110° C., and in heat fixation treatment and relaxation treatment steps after the biaxial stretching, first, a relaxation treatment is performed while heat treatment (first stage) at a temperature lower than the stretching temperature in the width direction is performed, and subsequently, the film can be obtained by appropriately subjecting the film to a multi-stage heat fixation treatment and a relaxation treatment in which a heat treatment (second stage) is performed at a temperature lower than the first stage heat treatment temperature and 135° C. or higher, and a heat treatment (third stage) is further performed at 80° C. or higher and lower than the second stage heat treatment temperature while maintaining tension in the width direction.

For the polypropylene film according to the present invention, the thermal shrinkage ratio in the film width direction is preferably 1.0% or less after a heat treatment at 125° C. for 15 minutes. The thermal shrinkage ratio in the width direction is more preferably 0.8% or less, still more preferably 0.6% or less, particularly preferably 0.4% or less. The lower limit is not particularly limited but is preferably −0.2%, because the winding of the element may be loosened due to heat in the capacitor production process or use process. If the thermal shrinkage ratio exceeds 1%, shrinkage of the film itself occurs due to the heat in the capacitor production process or use process, the voltage resistance of the element may lower due to poor contact with the metal-sprayed part at the end of the element, and tight winding of the element may cause capacity reduction or short-circuit breakdown, resulting in deterioration of reliability.

In order to control the thermal shrinkage ratio in the heat treatment at 125° C. for 15 minutes in the film width direction within the above-mentioned preferable range, as described later, for example, a raw material having a high meso-pentad fraction and a cold xylene soluble component (CXS) of less than 3.0% by mass is used as the polypropylene raw material (A), preliminary stretching of 1.01 to 1.10 times is performed before stretching in the longitudinal direction, an area stretch ratio is set to 65 times or more during biaxial stretching and a stretch ratio in the width direction is set to 11.0 times or more, and in heat set treatment and relaxation treatment steps after the biaxial stretching, first, a relaxation treatment is performed while heat treatment (first stage) at a temperature lower than the stretching temperature in the width direction is performed, and subsequently, the film can be realized by appropriately subjecting the film to a multi-stage heat set treatment and a relaxation treatment in which a heat treatment (second stage) is performed at a temperature lower than the first stage heat treatment temperature and 135° C. or higher, and a heat treatment (third stage) is further performed at 80° C. or higher and lower than the second stage heat treatment temperature while maintaining tension in the width direction.

It is preferable that (Tm−Tc)≤65° C., where (Tm) (° C.) is a melting peak temperature of a film obtained by heating the polypropylene film of the present invention from 30° C. to 260° C. at 20° C./min with a differential scanning calorimeter DSC, and (Tc) (° C.) is a crystallization peak temperature obtained by lowering the temperature from 260° C. to 30° C. at 20° C./min after the heating. (Tm−Tc) is more preferably 63° C. or lower, still more preferably 61° C. or lower, still more preferably 59° C. or lower, particularly preferably 57° C. or lower. When (Tm−Tc) exceeds 65° C., it means that a long time is required until the molten resin is recrystallized, the crystallization time in the cooling and solidification process of the resin becomes long, and coarse spherulites may be formed. When a cast sheet having such coarse spherulites are stretched, internal voids may be formed in the stretching step, coarse protrusions may be formed on the surface, and the reliability when the cast sheet is formed into a capacitor may be impaired, or the lubricity of the film may be deteriorated due to an increase in flat portions, and the processability may be deteriorated. The lower limit value of (Tm−Tc) is not particularly specified, but it is preferably set to 40° C. from the viewpoint of film formation stability. In this regard, in a case where the polypropylene film of the present invention is a film including polypropylene and a thermoplastic resin that is incompatible with polypropylene, the melting peak temperature of the incompatible resin may be observed at a temperature that is different from the peak temperature of polypropylene, but in the present invention, the peaks observed at 170° C. or higher and 200° C. or lower are regarded as the melting peak temperature (Tm) (° C.) and the crystallization peak temperature (Tc) (° C.) of the polypropylene film of the present invention. In this regard, there is a case where two or more peaks are observed within the temperature range or a case of a peak temperature that can be observed on a multi-stage DSC chart referred to as a shoulder (observed in the case of a chart with two or more peaks overlapped with each other), but in the present invention, peaks with the largest absolute values of vertical axis heat flow (unit: mW) on a DSC chart are selected and respectively regarded as (Tm) (° C.) and (Tc) (° C.).

(Tm−Tc) can be controlled to fall within the above-mentioned preferable range by, for example, using the polypropylene raw material (A) and/or the polypropylene raw material (B) having preferable characteristics to be described later, containing a branched polypropylene raw material (C), or setting the composition of these raw materials to fall within preferable ranges to be described later.

For the polypropylene film of the present invention, the melting peak temperature (Tm) (° C.) obtained by heating the film from 30° C. to 260° C. at 20° C./min with a differential scanning calorimeter (DSC) is preferably 170° C. or higher. The temperature is more preferably 171° C. or higher, still more preferably 172° C. or higher, even more preferably 173° C. or higher, most preferably 174° C. or higher. The upper limit is not particularly limited but is preferably 200° C. Higher (Tm) (° C.) means that the degree of crystallinity of the film is higher, which is preferable from the viewpoint of improving the dielectric breakdown voltage under high temperature environments. When (Tm) (° C.) is lower than 170° C., withstand voltage characteristics and reliability in a high temperature environment may be poor. In this regard, in a case where the polypropylene film of the present invention is a film including polypropylene and a thermoplastic resin that is incompatible with polypropylene, the melting peak temperature of the incompatible resin may be observed at a temperature that is different from the melting peak temperature of polypropylene, but in embodiments of the present invention, the peak observed at 170° C. or higher and 200° C. or lower is regarded as the melting peak temperature (Tm) (° C.) of the film obtained by heating from 30° C. to 260° C. at 20° C./min with a differential scanning calorimeter (DSC). In this regard, there is a case where two or more melting peak temperatures are observed within the temperature range or a case of a peak temperature that can be observed on a multi stage DSC chart referred to as a shoulder (observed in the case of a chart with two or more peaks overlapped with each other), but in the present invention, the temperature of a peak with the largest absolute value of vertical axis heat flow (unit: mW) on a DSC chart is regarded as (Tm) (° C.).

In order to control (Tm) (° C.) within the above-mentioned preferable range, for example, a method of adjusting the composition of the polypropylene raw material can be used. More specifically, this can be achieved by using a component having a high melting point as a polypropylene raw material or by increasing the proportion of a component having a relatively high melting point.

In the polypropylene film of the present invention, when one surface is a surface A and the other surface is a surface B, the protrusion mountain height (SpkA) (nm) of the surface A and the protrusion mountain height (SpkB) (nm) of the surface B preferably satisfy the following relationship.

$SpkA < SpkB$ $20\ nm \leq SpkA \leq 100\ nm$ $80\ nm \leq SpkB \leq 150\ nm.$ (Spk) is a kind of functional parameter defined by ISO 25178 and indicates an average height of a portion (protruding mountain part) higher than an intersection of an equivalent straight line (a straight line having the smallest inclination among straight lines having a difference of 40% in load area ratio (Smr)) of a bearing curve (the frequency at a certain height is accumulated from the higher side and expressed as a percentage with the total number of all height data being 100%. The load area ratio at a certain height C is given by Smr (C)) of height data and the load area ratio=0%.

In the polypropylene film of the present invention, the lower limit of SpkA (nm) is more preferably 30 nm, still more preferably 40 nm. The upper limit of SpkA (nm) is more preferably 90 nm, still more preferably 80 nm.

In the polypropylene film of the present invention, the lower limit of SpkB (nm) is more preferably 90 nm, still more preferably 100 nm. The upper limit of SpkB (nm) is more preferably 140 nm, still more preferably 130 nm.

When SpkA (nm) and SpkB (nm) do not satisfy the above-mentioned preferable ranges, sufficient lubricity cannot be obtained because the surface projection height of the film is small, so that processability at the time of producing a capacitor element may be insufficient, or conversely, excessively high projections may be present on the film surface, leading to a decrease in withstand voltage of the capacitor.

SpkA (nm) and SpkB (nm) can be controlled to fall within the above-mentioned range by, for example, using the polypropylene raw material (B) having preferable characteristics to be described later, setting the area stretch ratio to 65 times or more during biaxial stretching and the stretch ratio in the width direction to 11.0 times or more, and controlling the casting drum temperature, the melting peak temperature (Tm) (° C.) of the film, and the crystallization peak temperature (Tc) (° C.) to fall within preferable ranges.

The polypropylene film of the present invention preferably has a total valley side volume of 50 to 5,000 $\mu m^3$, which is the total volume of valleys having a depth of 20 nm or more in a region of 0.561×0.561 mm², on at least one surface of the film, from the viewpoint of improving the element processability and improving the voltage resistance by having a small number of surface recesses and moderate lubricity. The total valley side volume is more preferably 100 µm³ or more and still more preferably 500 µm³ or more from the viewpoint of the lower limit. The total valley side volume is more preferably 4,000 µm³ or less and still more preferably 3,000 µm³ or less from the viewpoint of the upper limit. When the total valley side volume is less than 50 µm³, the film tends to be flat without unevenness on the surface, and in this case, slippage of the film is extremely reduced, so that handleability is deteriorated, wrinkles tend to occur, and element processability may be affected. In addition, when the film is used as a capacitor for a long time, a change in capacitance is increased due to the influence of wrinkles or the like, or when the film is laminated to form a capacitor, there is no appropriate gap between the films, so that the self-healing function (self-healing) is difficult to operate, and the reliability of the capacitor may be lowered. On the other hand, when the volume is more than 5,000 µm³, there are many portions where the thickness is locally small, and there is a possibility that dielectric breakdown occurs from the portions, and the voltage resistance of the film is lowered. In particular, when the film is used for high-voltage capacitor applications, the voltage resistance and reliability in a high temperature environment may be impaired. By setting the total valley side volume to the above-mentioned preferable range (the total valley side volume is 50 µm³ or more and 5,000 µm³ or less), the surface is less recessed, the possibility of occurrence of dielectric breakdown at low voltage is reduced, the voltage resistance of the film is improved, and particularly when the film is used for high-voltage capacitor applications, the voltage resistance and reliability in a high temperature environment are improved, and a change in the capacitance when the film is used for a long time as a capacitor can be suppressed. In addition, in the case of the capacitor in which films are laminated, since an appropriate gap can be formed between the films, the self-healing function (self-healing) can be operated, and the reliability of the capacitor can be improved.

The total valley side volume of the film surface can be allowed to fall within the above-mentioned preferable range by, for example, using the polypropylene raw material (B) having preferable characteristics to be described later, setting the area stretch ratio to 65 times or more during biaxial stretching and the stretch ratio in the width direction to 11.0 times or more, and controlling the casting drum temperature, the melting peak temperature (Tm) (° C.) of the film, and the crystallization peak temperature (Tc) (° C.) to fall within preferable ranges.

In the polypropylene film of the present invention, when the polypropylene film is completely dissolved with xylene and then precipitated at room temperature, the polypropylene component dissolved in xylene (CXS, also referred to as a cold xylene soluble component) is preferably less than 3.0% by mass, more preferably less than 1.5% by mass. Here, the CXS is considered to correspond to a component that is difficult to crystallize due to low stereoregularity, low molecular weight, or the like. By setting the CXS to less than 1.5% by mass, it is possible to increase the heat resistance of the film, increase the dielectric breakdown voltage at high temperatures, and improve the thermal dimensional stability. On the other hand, when the CXS is 1.5% by mass or more, the film may be easily relaxed in a high temperature environment, the dielectric breakdown voltage at a high temperature may decrease, or the leakage current may increase. Thus, the CXS is more preferably 1.3% by mass or less, still more preferably 1.1% by mass or less, most preferably 0.9% by mass or less. In order to set such a CXS content (CXS of less than 1.5% by mass), a method of enhancing the catalytic activity in obtaining the polypropylene resin to be used, a method of washing the obtained polypropylene resin with a solvent or a propylene monomer itself, or the like can be used. The lower limit of the CXS is not particularly limited and is practically 0.1% by mass. If the CXS is to be less than 0.1% by mass, the stretchability during film formation may be deteriorated to cause breakage.

The polypropylene film of the present invention preferably has a film dielectric breakdown voltage of 350 V/µm or more at 130° C. It is more preferably 375 V/µm or more, still more preferably 400 V/µm or more, particularly preferably 420 V/µm or more. The upper limit is not particularly limited and is about 800 V/µm. If the film dielectric breakdown voltage at 130° C. is 350 V/µm or more, short-circuit breakdown hardly occurs particularly when the film is used for a long time in a high temperature environment as a capacitor, the voltage resistance is maintained, and high reliability can be obtained.

In order to control the film dielectric breakdown voltage at 130° C. within the above-mentioned range (350 V/µm or more), as described later, for example, a raw material having a high meso-pentad fraction and a cold xylene soluble component (CXS) of less than 3.0% by mass is used as the polypropylene raw material (A), preliminary stretching of 1.01 to 1.10 times is performed before stretching in the longitudinal direction, an area stretch ratio is set to 65 times or more during biaxial stretching and a stretch ratio in the width direction is set to 11.0 times or more, and in heat set treatment and relaxation treatment steps after the biaxial stretching, first, a relaxation treatment is performed while heat treatment (first stage) at a temperature lower than the stretching temperature in the width direction is performed, and subsequently, the film can be realized by appropriately subjecting the film to a multi-stage heat set treatment and a relaxation treatment in which a heat treatment (second stage) is performed at a temperature lower than the first stage heat treatment temperature and 135° C. or higher, and a heat treatment (third stage) is further performed at 80° C. or higher and lower than the second stage heat treatment temperature while maintaining tension in the width direction.

As a relationship between the weight average molecular weight (Mw) and the Z+1 average molecular weight (Mz+1) in the polypropylene film of the present invention, Mz+1/Mw is preferably 10.0 or less. The upper limit of Mz+1/Mw is more preferably 7.9, still more preferably 6.9, particularly preferably 6.5, most preferably 6.1. A smaller Mz+1/Mw means a narrower molecular weight distribution and a more uniform structure, which is preferable from the viewpoint of obtaining the effect of improving the dielectric breakdown voltage in a high temperature environment. On the other hand, when Mz+1/Mw exceeds 10.0, local unevenness is likely to exist in the film structure, and the withstand voltage characteristics and reliability under a high temperature environment may be poor, such as an increase in thermal shrinkage ratio and a decrease in dielectric breakdown voltage. The lower limit of Mz+1/Mw is not particularly limited but is set to 3.0. The control of Mz+1/Mw within the above-mentioned range (10.0 or less) can be achieved by using, as the polypropylene resin (A), a raw material having a meso-pentad fraction of 0.97 or more or a chip melting point (indicating the melting point of the resin. The same applies hereinafter) of 160° C. or more, a cold xylene soluble component (CXS) of less than 3.0% by mass, a number average molecular weight (Mn) of 70,000 or less, and a Z+1 average molecular weight (Mz+1) of less than 3 million, and appropriately blending a polypropylene resin (B) and/or a polypropylene resin (C) within the preferable range of the present application.

Next, raw materials preferably used for polypropylene of the present invention will be described.

A raw material used for the polypropylene film of the present invention preferably contains a linear polypropylene resin (A) as a main component. The main component herein means a component having the highest percentage by mass (a component of a large content) among components constituting the polypropylene film.

The lower limit of the number average molecular weight (Mn) of the polypropylene raw material (A) is preferably 30,000, more preferably 40,000, still more preferably 50,000. The upper limit of Mn is preferably 90,000, more preferably 80,000. The lower limit of the Z+1 average molecular weight (Mz+1) of the polypropylene raw material (B) is preferably 1 million, more preferably 1.5 million. The upper limit of Mz+1 is preferably 2.5 million, more preferably 2 million.

The polypropylene raw material (A) preferably has a cold xylene soluble component (hereinafter referred to as a CXS) of 3.0% by mass or less. If these conditions are not satisfied, the film formation stability may be poor, the strength of the film may be reduced, or the dimensional stability and heat resistance may be greatly reduced. Herein, the "cold xylene soluble component (CXS)" refers to a polyolefin component dissolved in xylene that is obtained by completely dissolving a sample in xylene and then precipitating the resultant at room temperature. This component is thought to correspond to a component that is hardly crystallized because of low stereoregularity or a low molecular weight. When a large amount of such a component is contained in the resin, the withstand voltage in a high temperature environment may be poor. Accordingly, the CXS is preferably 3.0% by mass or less, more preferably 2% by mass or less, particularly preferably 1.5% by mass or less. The CXS is preferably as low as possible, but the lower limit is about 0.1% by mass. To obtain such a CXS, it is possible to employ a method of enhancing the catalyst activity in obtaining a resin or a method of washing the obtained resin with a solvent or an olefin monomer itself.

The polypropylene raw material (A) preferably has a meso-pentad fraction of 0.97 or more. It is more preferably 0.975 or more, still more preferably 0.98 or more, most preferably 0.983 or more. The meso-pentad fraction is an index of stereoregularity of a crystal phase of polypropylene measured by the nuclear magnetic resonance method (NMR method), and a material having a higher meso-pentad fraction is preferred because it has a higher degree of crystallinity, higher melting point, and suitability for use at high temperatures. The upper limit of the meso-pentad fraction is not particularly limited. In order to obtain a resin having high stereoregularity as described above, for example, a method of washing the obtained resin powder with a solvent such as n-heptane and a method of appropriately selecting a catalyst and/or a cocatalyst or composition is preferably adopted.

Polypropylene preferably used as the polypropylene raw material (A) has a chip melting point of 160° C. or higher. The temperature is more preferably 163° C. or higher, still more preferably 166° C. or higher. When the polypropylene raw material (A) has a chip melting point lower than 160° C., the withstand voltage characteristics in a high temperature environment may be impaired when the polypropylene raw material (A) is formed into a film.

The chip melting point is a melting peak temperature obtained when the polypropylene raw material (A) is heated from 30° C. to 260° C. at 20° C./min with a differential scanning calorimeter DSC. There is a case where two or more melting peak temperatures are observed within the temperature range or a case of a peak temperature that can be observed on a multi-stage DSC chart referred to as a shoulder (observed in the case of a chart with two or more peaks overlapped with each other), but in the present invention, the temperature of a peak with the largest absolute value of vertical axis heat flow (unit: mW) on a DSC chart is regarded as the chip melting point.

The polypropylene raw material (A) is mainly made of a homopolymer of propylene, but a copolymerizing component based on another unsaturated hydrocarbon may be used, or a polymer that is not a homopolymer of propylene may be blended as long as the object of the present invention is not impaired. Examples of a monomer component other than propylene constituting such a copolymerization component or blend include ethylene, 1-butene, 1-pentene, 3-methylpentene-1, 3-methylbutene-1, 1-hexene, 4-methylpentene-1, 5-ethylhexene-1, 1-octene, 1-decene, 1-dodecene, vinylcyclohexene, styrene, allylbenzene, cyclopentene, norbornene, and 5-methyl-2-norbornene.

The copolymerization amount or blending amount of components other than the propylene component is preferably less than 1 mol % as the copolymerization amount from the viewpoint of the dielectric breakdown voltage and heat resistance, and the blending amount is preferably less than 1% by mass of the entire resin constituting the film as the amount of components other than propylene.

The polyolefin film of the present invention can contain the polypropylene raw material (B) in addition to the polypropylene raw material (A).

The lower limit of the number average molecular weight (Mn) of the polypropylene raw material (B) is preferably 50,000, more preferably 60,000 or more, still more preferably 70,000 or more. The upper limit of (Mn) is preferably 120,000, more preferably 110,000, still more preferably 100,000.

(Mn) of the polypropylene raw material (B) is preferably larger than (Mn) of the polypropylene raw material (A). (Mn) of the polypropylene raw material (B) is preferably larger than (Mn) of the polypropylene raw material A by 10,000 or more, more preferably larger by 20,000 or more.

The lower limit of the Z+1 average molecular weight (Mz+1) of the polypropylene raw material (B) is preferably 2.5 million, more preferably 3 million, still more preferably 3.5 million. The upper limit of Mz+1 is preferably 8 million, more preferably 7 million.

The Mz+1 average molecular weight of the polypropylene raw material (B) is preferably larger than the Mz+1 average molecular weight of the polypropylene raw material (A) or more. The Mz+1 average molecular weight of the polypropylene raw material (B) is preferably 500,000 or more, more preferably 1 million or more, still more preferably 1.5 million or more larger than the Mz+1 average molecular weight of the polypropylene raw material (A).

The polypropylene raw material (B) preferably has a cold xylene soluble component (hereinafter referred to as a CXS) of 4.0% by mass or less. If these conditions are not satisfied, the film formation stability may be poor, the strength of the film may be reduced, or the dimensional stability and heat resistance may be greatly reduced. Accordingly, the CXS is preferably 4.0% by mass or less, more preferably 3% by mass or less. The CXS is preferably as low as possible, but the lower limit is about 0.1% by mass. To obtain such a CXS, it is possible to employ a method of enhancing the catalyst activity in obtaining a resin or a method of washing the obtained resin with a solvent or an olefin monomer itself.

The polypropylene raw material (B) preferably has a meso-pentad fraction of 0.94 or more, more preferably 0.95 or more, still more preferably 0.96 or more.

Polypropylene preferably used as the polypropylene raw material (B) has a chip melting point of 160° C. or higher. The temperature is more preferably 162° C. or higher, still more preferably 164° C. or higher. When the polypropylene raw material (B) has a chip melting point lower than 160° C., the withstand voltage characteristics in a high temperature environment may be impaired when the polypropylene raw material (B) is formed into a film.

When the polypropylene film of the present invention contains the polypropylene resin (B), the content thereof is preferably 1 to 30% by mass with respect to 100% by mass of the polypropylene film. The lower limit of the content of the polypropylene raw material (B) is more preferably 2% by mass. The upper limit of the content of the polypropylene raw material (B) is more preferably 25% by mass, still more preferably 20% by mass.

The number average molecular weight (Mn), the Z+1 average molecular weight (Mz+1), the melt flow rate (MFR), the cold xylene soluble component (CXS), the meso-pentad fraction, the chip melting point, and the content of the polypropylene raw material (B) are set within the above-described preferable ranges, preliminary stretching of 1.01 to 1.10 times is performed in the longitudinal direction before stretching, an area stretch ratio is set to 65 times or more during biaxial stretching and a stretch ratio in the width direction is set to 11.0 times or more, and in heat set treatment and relaxation treatment steps after the biaxial stretching, first, a relaxation treatment is performed while heat treatment (first stage) at a temperature lower than the stretching temperature in the width direction is performed, and subsequently, the film is appropriately subjected to a multi-stage heat set treatment and a relaxation treatment in which a heat treatment (second stage) is performed at a temperature lower than the first stage heat treatment temperature and 135° C. or higher, and a heat treatment (third stage) is further performed at 80° C. or higher and lower than the second stage heat treatment temperature while maintaining tension in the width direction, whereby appropriate protrusions are formed on the surface due to a difference in viscosity from the polypropylene raw material (A), and the number of tie molecules connecting crystals is further increased, so that the orientation of molecular chains is easily increased when the stretch ratio is increased, and the binding force of amorphous chains in a high temperature environment can be increased.

The polypropylene raw material (B) is mainly made of a homopolymer of propylene, but a copolymerizing component based on another unsaturated hydrocarbon may be used, or a polymer that is not a homopolymer of propylene may be blended as long as the object of the present invention is not impaired. Examples of a monomer component other than propylene constituting such a copolymerization component or blend include ethylene, 1-butene, 1-pentene, 3-methylpentene-1, 3-methylbutene-1, 1-hexene, 4-methylpentene-1, 5-ethylhexene-1, 1-octene, 1-decene, 1-dodecene, vinylcyclohexene, styrene, allylbenzene, cyclopentene, norbornene, and 5-methyl-2-norbornene. The copolymerization amount or blending amount of components other than the propylene component is preferably less than 1 mol % as the copolymerization amount from the viewpoint of the dielectric breakdown voltage and heat resistance, and the blending amount is preferably less than 1% by mass of the entire resin constituting the film as the amount of components other than propylene.

The polyolefin film of the present invention may contain a branched polypropylene raw material (C) in addition to the polypropylene raw material (A) and the polypropylene raw material (B). Specifically, commercially available products of "Profax" (registered trademark) (PF-814 and the like) manufactured by LyondellBasell Industries N.V., "Daploy" (trademark) (WB130HMS, WB135HMS, WB140HMS, and the like) manufactured by Borealis AG, and "WAYMAX" (registered trademark) (MFX8, MFX6, MFX3, and the like) manufactured by Japan Polypropylene Corporation can be appropriately selected and used as the polypropylene raw material (C).

A plurality of polypropylene raw materials (C) such as ones produced with a Ziegler-Natta catalyst system and a metallocene catalyst system are produced, and the metallocene catalyst system that provides a small amount of low molecular weight components and high molecular weight components and a narrow molecular weight distribution is more preferable from the viewpoint of use in combination with the polypropylene raw material (A) and the polypropylene raw material (B).

The melt flow rate (MFR) of the polypropylene raw material (C) is preferably in the range of 2 g/10 min or more and 15 g/10 min or less (230° C., 21.18 N load) from the viewpoint of ease of mixing with the plypropylene raw material (A) and the polypropylene raw material (B). The lower limit of the MFR is more preferably 3 g/10 min. The upper limit is more preferably 12 g/10 min, still more preferably 10 g/10 min. In order to set the MFR to a value within the above-mentioned range, a method of controlling the average molecular weight or molecular weight distribution is employed.

The polypropylene raw material (C) preferably has a CXS of 5.0% by mass or less. The CXS is more preferably 3.0% by mass or less. The CXS is preferably as low as possible, but the lower limit is about 0.1% by mass. To control the CXS within such a range, it is possible to employ a method of enhancing the catalyst activity in obtaining a resin or a method of washing the obtained resin with a solvent or an olefin monomer itself.

The melt tension of the polypropylene raw material (C) is preferably 2 cN or more and 40 cN or less from the viewpoint of stretching uniformity. The lower limit of the melt tension is more preferably 3 cN, still more preferably 5 cN. The upper limit is more preferably 30 cN, still more preferably 20 cN. In order to set the melt tension to the above value, a method of controlling the average molecular weight, the molecular weight distribution, and the degree of branching in the polypropylene raw material or the like is employed.

The content of the polypropylene resin (C) in the polypropylene film of the present invention is preferably more than 0.10% by mass with respect to 100% by mass of the polypropylene film. The lower limit of the content of the polypropylene raw material (C) is more preferably 0.15% by mass, still more preferably 0.20% by mass, particularly preferably 0.50% by mass. The upper limit of the content of the polypropylene raw material (C) is more preferably 10% by mass, still more preferably 4.5% by mass, particularly preferably 3.0% by mass. When the content of the polypropylene resin (C) is within the above range, the spherulite size can be prevented from becoming too large when the molten polymer is formed into a sheet shape, and the high-temperature withstand voltage can be maintained.

The polypropylene resin used for the polypropylene film of the present invention may contain various additives, for example, organic particles, inorganic particles, a crystal nucleating agent, an antioxidant, a heat stabilizer, a chlorine scavenger, a sliding agent, an antistatic agent, an antiblocking agent, a filler, a viscosity modifier, and a coloring inhibitor as long as the object of the present invention is not impaired.

When an antioxidant is contained among these, selection of the type and additional amount of the antioxidant is important from the viewpoint of long-term heat resistance. That is, the antioxidant is preferably a phenol-based antioxidant having steric hindrance, and at least one of the antioxidants is preferably a high molecular weight type having a molecular weight of 500 or more. Specific examples thereof include various examples, and for example, it is preferable to use 2,6-di-t-butyl-p-cresol (BHT: molecular weight 220.4) in combination with 1,3,5-trimethyl-2,4,6-tris(3,5-di-t-butyl-4-hydroxybenzyl)benzene (for example, "Irganox" (registered trademark) 1330: molecular weight 775.2, manufactured by BASF) or tetrakis[methylene-3(3,5-di-t-butyl-4-hydroxyphenyl)propionate]methane (for example, "Irganox" (registered trademark) 1010: molecular weight 1,177.7, manufactured by BASF). The total content of these antioxidants is preferably in the range of 0.1% to 1.0% by mass with respect to the total amount of polypropylene. If the amount of the antioxidant is too small, the long-term heat resistance may be poor. If the amount of the antioxidant is too large, blocking at a high temperature due to bleed-out of the antioxidant may adversely affect the capacitor element. The total content is more preferably 0.2% to 0.7% by mass, particularly preferably 0.2% to 0.4% by mass with respect to the mass of the entire resin.

The polypropylene film of the present invention may contain a resin other than the polypropylene resin as long as the object of the present invention is not impaired. Examples of the resin other than the polypropylene resin include vinyl polymer resins containing various polyolefin-based resins, polyester-based resins, polyamide-based resins, polyphenylene sulfide-based resins, polyimide-based resins, and polycarbonate-based resins. Particularly preferable examples include polymethylpentene, a cycloolefin copolymer, a cycloolefin polymer, and syndiotactic polystyrene. The content of the resin other than the polypropylene resin is preferably less than 30% by mass, more preferably 19% by mass or less, still more preferably 15% by mass or less, most preferably 9% by mass or less, when the total amount of the resin components constituting the polypropylene film is 100% by mass. If the content of the resin other than the polypropylene resin is 30% by mass or more, the influence of the domain boundary is large, so that the dielectric breakdown voltage in a high temperature environment may be lowered.

The polypropylene film of the present invention preferably has a film thickness of 0.5 μm or more and less than 25 μm from the viewpoint of being suitable for a heat-resistant film capacitor of a thin film required for automobile applications (including hybrid car applications) and the like particularly used in a high temperature environment. The film thickness is more preferably 0.6 μm or more and 6.0 μm or less, still more preferably 0.8 μm or more and 4.0 μm or less, most preferably 1.0 μm or more and 2.5 μm or less in terms of a balance between characteristics and a capacitor size due to thinning as the heat-resistant film capacitor application.

The polypropylene film of the present invention is preferably in the form of a monolayer film and may be in the form of a multilayer film.

The polypropylene film of the present invention is preferably used as a dielectric film for a capacitor, but the type of the capacitor is not limited. Specifically, from the viewpoint of the electrode configuration, it may be either a combined winding capacitor of a metal foil and a film or a vapor deposited metal film capacitor and is also preferably used for an oil-impregnated capacitor impregnated with an insulating oil or a dry capacitor that does not use an insulating oil at all. However, from the characteristics of the film of the present invention, it is particularly preferably used as a vapor deposited metal film capacitor. From the viewpoint of the shape, it may be a winding type or a lamination type.

Since a polypropylene film usually has low surface energy and it is difficult to stably perform metal vapor deposition, it is preferable to perform a surface treatment before vapor deposition for the purpose of improving adhesion to a metal layer. Specific examples of the surface treatment include a corona discharge treatment, a plasma treatment, a glow treatment, and a flame treatment. Usually, a surface wet tension of the polypropylene film is about 30 mN/m, but by these surface treatments, it is preferable to set the wet tension to preferably 37 to 75 mN/m, more preferably 39 to 65 mN/m, most preferably about 41 to 55 mN/m because the adhesion to the metal layer is excellent and security is also good.

The polypropylene film of the present invention can be obtained by biaxial stretching, a heat treatment, and a relaxation treatment using a raw material capable of giving the above-mentioned characteristics. As a method of the biaxial stretching, any of an inflation simultaneous biaxial stretching method, a tenter simultaneous biaxial stretching method, and a tenter sequential biaxial stretching method can be employed, and among them, a tenter sequential biaxial stretching method is preferably employed in terms of controlling the film formation stability, a crystalline/amorphous structure, and the surface characteristics, particularly the mechanical characteristics and thermal dimensional stability while increasing the stretch ratio in the width direction of the present invention.

Next, a method for producing the polypropylene film of the present invention will be described as an example. First, a polypropylene resin is melt-extruded onto a support to form an unstretched polypropylene film. This unstretched polypropylene film is stretched in the longitudinal direction and then stretched in the width direction to be sequentially biaxially stretched. Thereafter, the heat treatment and the relaxation treatment are performed to produce a biaxially oriented polypropylene film. Hereinafter, the present invention will be described more specifically, but the present invention is not necessarily interpreted to be limited thereto.

First, the polypropylene raw material (A) is melt-extruded from a single screw extruder set at an extrusion temperature of preferably 220 to 280° C., more preferably 230 to 270° C., passed through a filtration filter, and then extruded from a slit-shaped spinneret at a temperature of preferably 200 to 260° C., more preferably 210 to 240° C. The molten sheet extruded from the slit-shaped spinneret is solidified on a casting drum (cooling drum) controlled at a temperature of 10° C. to 110° C. to obtain an unstretched polypropylene film. As a method for bringing the molten sheet into close contact with a casting drum, any one of an electrostatic application method, an adhesion method using the surface tension of water, an air knife method, a press roll method, an underwater casting method, an air chamber method, and the like may be used, but an air knife method having good flatness and capable of controlling surface roughness is preferable. In addition, in order not to cause vibration of the film, it is preferable to appropriately adjust the position of the air knife so that the air flows to the downstream side of the film formation. The temperature of the casting drum is preferably 60° C. to 110° C., more preferably 80° C. to 110° C. from the viewpoint of improving the element processability and improving the voltage resistance by having a small surface recess and moderate lubricity.

Next, the unstretched polypropylene film is biaxially stretched to be biaxially oriented. In particular, in the present invention, it is preferable to perform multi-stage stretching of preliminary stretching and main stretching in the longitudinal stretching step. The unstretched polypropylene film is preheated by being passed between rolls preferably kept at 70 to 150° C., more preferably at 80 to 145° C., and subjected to preliminary stretching of 1.01 to 1.10 times in the longitudinal direction. As a result, the spherulite breakage of the unstretched sheet proceeds moderately, and the molecular chains are preoriented, so that the crystal orientation and the restriction of the amorphous chains of the stretched film obtained after the subsequent main stretching can be further enhanced, the withstand voltage of the film can be improved, and (Tf) (° C.) and (Ts) (° C.) of the film can be enhanced.

Subsequently, the polypropylene film preliminarily stretched in the longitudinal direction is maintained at a temperature of preferably 70 to 150° C., more preferably 80 to 145° C., subjected to main stretching in the longitudinal direction to preferably 2.0 to 15 times, more preferably 4.5 to 12 times, still more preferably 5.5 to 10 times, and then cooled to room temperature.

Next, the film is guided to the tenter while the end of the film uniaxially stretched in the longitudinal direction is held by a clip. Here, in the present invention, when the temperature of the preheating step immediately before stretching in the width direction is preferably set to the stretching temperature in the width direction+5 to +15° C., more preferably +5 to +12° C., still more preferably +5 to +10° C., a fibril structure highly oriented in the longitudinal direction by uniaxial stretching can be further strengthened, and the change in the dielectric breakdown voltage before and after film heating can be suppressed. In addition, it is preferable from the viewpoint that the thermal dimensional stability can be improved by stabilizing a molecular chain having insufficient orientation by high temperature preheating after uniaxial stretching. When the preheating temperature is lower than the stretching temperature+5° C., the change in the dielectric breakdown voltage before and after heating of the film cannot be suppressed, and the thermal dimensional stability may not be improved. On the other hand, when the preheating temperature is higher than the stretching temperature+15° C., the film may be broken in the stretching step.

Next, the temperature (stretching temperature in the width direction) at which the film is stretched in the width direction while the end of the film is held by the clip is preferably 150° C. to 170° C., more preferably 155° C. to 165° C.

From the viewpoint of suppressing the change in the dielectric breakdown voltage before and after heating the film, the stretch ratio in the width direction is preferably 11.0 to 20.0 times, more preferably 11.5 to 19.0 times, most preferably 12.0 to 18.0 times. When the stretch ratio in the width direction is less than 11.0 times, the orientation contribution of the fibril structure highly oriented in the longitudinal direction by uniaxial stretching remains largely, so that a film in which the change in the dielectric breakdown voltage before and after heating the film cannot be suppressed may be obtained. It is preferable to increase the stretch ratio in the width direction because the orientation in the width direction is imparted while a high orientation state in the longitudinal direction is maintained, so that in-plane molecular chain tension is increased, and further, the structural stability against heat can be improved, so that the effect of improving the trade-off thermal shrinkage characteristics can be obtained. On the other hand, when the stretch ratio in the width direction is more than 20.0 times, film breakage during the film formation is likely to occur, and productivity may be poor.

Here, the area stretch ratio is preferably 65 times or more from the viewpoint of suppressing a change in the dielectric breakdown voltage before and after heating the film and making the film excellent in the long-term use reliability in high temperature environments when used as a capacitor. In the present invention, the area stretch ratio is obtained by multiplying the stretch ratio in the longitudinal direction by the stretch ratio in the width direction. The area stretch ratio is more preferably 66 times or more, still more preferably 68 times or more, most preferably 72 times or more. The upper limit of the area stretch ratio is not particularly limited but is 90 times from the viewpoint of feasibility.

In the production of the polypropylene film of the present invention, in the subsequent heat treatment and relaxation treatment steps, it is preferable that a multi stage heat treatment in which heat set (heat treatment at first stage) be performed at a temperature (heat treatment temperature at first stage) of 145° C. or higher and 165° C. or lower and lower than the stretching temperature in the width direction while giving 2 to 20% relaxation in the width direction while tensely gripping the film in the width direction with a clip and heat treatment (heat treatment at second stage) be performed again at a temperature of 135° C. or higher and lower than the heat set temperature (heat treatment temperature at first stage) while tensely gripping the film in the width direction with a clip, and heat set (heat treatment at third stage) be performed at a temperature of 80° C. or higher and lower than the heat set temperature (heat treatment temperature at second stage) while tensely gripping the film is further performed, from the viewpoint that change in the dielectric breakdown voltage before and after heating is suppressed, the structural stability against heat is improved, and the voltage resistance and reliability can be obtained when used as a capacitor.

In the relaxation treatment, the relaxation ratio is preferably 2 to 20%, more preferably 5 to 18%, still more preferably 8 to 15% from the viewpoint of enhancing the structural stability against heat. If the relaxation ratio is more than 20%, the film may be excessively slack inside the tenter, wrinkles may be formed in the product, and unevenness may be generated during vapor deposition, or the mechanical characteristics may be deteriorated. On the other hand, if the relaxation ratio is less than 2%, sufficient structural stability against heat cannot be obtained, and capacity reduction or short-circuit breakdown may occur in a high temperature environment when the film is used as a capacitor.

After the heat treatment for lowering the temperature in multiple stages, the film is guided to the outside of the tenter, the clip at the film end is released in a room temperature atmosphere, the film edge is slit in a winder step, and a film product roll having a film thickness of 0.5 μm or more and less than 10 μm is wound up. Here, in order to improve the adhesion of a vapor-deposited metal on a surface subjected to vapor deposition before winding the film, it is preferable to perform a corona discharge treatment in air, nitrogen, carbon dioxide, or a mixed gas thereof.

In order to obtain the polypropylene film according to embodiments of the present invention, specific examples of the intended production conditions are as follows.

- The melt extrusion temperature should be lowered in multiple stages before and after the filter and at the spinneret.
- The meso-pentad fraction of the polypropylene resin (A) is 0.970 or more.
- The CXS of the polypropylene resin (A) is less than 1.5% by mass.
- Preliminary stretching of 1.01 to 1.10 times is performed before longitudinal stretching.
- The area stretch ratio of stretching is 65 times or more.
- The stretch ratio in the width direction is 11.0 times or more.
- The preheating temperature before stretching in the width direction is higher than the stretching temperature in the width direction by 5° C. to 15° C.
- The heat treatment temperature at the first stage is 145° C. or higher and 165° C. or lower and lower than the stretching temperature in the width direction.
- The heat treatment temperature at the second stage is 135° C. or higher and lower than the heat treatment temperature at the first stage.
- The heat treatment temperature at the third stage is 80° C. or higher and lower than the heat treatment temperature at the second stage.
- In the heat treatment step at the first stage, relaxation treatment of 2 to 20% is performed in the width direction.

Subsequently, a metal layer laminated film obtained using the polypropylene film according to embodiments of the present invention, a film capacitor obtained using the metal layer laminated film, and a method for producing the metal layer laminated film and the film capacitor will be described.

The metal layer laminated film of the present invention has a metal layer d on at least one surface of the polypropylene film of the present invention. This metal layer laminated layered film can be obtained by providing a metal layer on at least one surface of the polypropylene film according to embodiments of the present invention.

In the present invention, the method for giving a metal layer is not particularly limited, and for example, a method is preferably used in which aluminum or an alloy of aluminum and zinc is vapor-deposited on at least one surface of a polypropylene film to provide a metal layer such as a vapor deposited film serving as an internal electrode of a film capacitor. At this time, other metal components such as nickel, copper, gold, silver, and chromium can be vapor-deposited simultaneously or sequentially with aluminum. A protective layer can also be provided on the deposited film with oil or the like. When the surface roughness of the polypropylene film is different between the front and back surfaces, it is preferable to provide a metal layer on the surface side having a smoother roughness to form a metal layer laminated film from the viewpoint of enhancing the voltage resistance.

In embodiments of the present invention, if necessary, after the metal layer is formed, the metal layer laminated film can be subjected to an annealing treatment or a heat treatment at a specific temperature. For insulation or other purposes, at least one surface of the metal layer laminated film may be coated with a resin such as polyphenylene oxide.

The film capacitor according to embodiments of the present invention is formed using the metal layer laminated film of the present invention. That is, the film capacitor of the present invention has the metal layer laminated film of the present invention.

For example, the film capacitor according to embodiments of the present invention can be obtained by laminating or winding the metal layer laminated film of the present invention described above by various methods. A preferred method for producing a wound film capacitor is as follows.

Aluminum is vapor-deposited on one surface of a polypropylene film under a reduced pressure. At that time, vapor deposition is performed in a stripe shape having a margin portion running in the longitudinal direction. Next, slits are made with a blade at the center of each vapor deposition portion and the center of each margin portion on the surface to produce a tape-shaped winding reel having a margin on one side of the surface. Two tape-shaped winding reels with a left or right margin, one each for the left margin and one for right margin, are overlapped and wound so that the vapor deposited portion protrudes from the margin portion in the width direction to obtain a wound body.

When both surfaces of the film are subjected to vapor deposition, aluminum is vapor-deposited in a stripe pattern having margins running in the longitudinal direction on one surface, and aluminum is vapor-deposited on the other surface in a stripe pattern so that margins in the longitudinal direction are positioned at the center of the aluminum deposited portion on the back surface. Next, slits are made with a blade at the center of each margin portion on the front and back surfaces to produce a tape-shaped winding reel having a margin on one side (for example, if there is a margin on the front right side, a margin is on the left side on back side) on both surfaces. Two sheets including one of the obtained reel and one of the undeposited laminated film are overlapped and wound so that the metallized film protrudes from the laminated film in the width direction to obtain a wound body.

A wound film capacitor can be obtained by removing a core material from the wound body produced as described above, pressing the wound body, performing metal spraying on both end surfaces to form external electrodes, and welding a lead wire to the metal-sprayed portions. A film capacitor can be used in a wide variety of applications such as railway vehicles, automobiles (hybrid cars and electric vehicles), solar power generation/wind power generation, and general home appliances, and the film capacitor of the present invention can also be suitably used in these applications. In addition, it can be used in various applications such as a packaging film, a release film, a processing film, a sanitary product, an agricultural product, a building product, and a medical product, particularly in applications including a heating step in film processing.

Measurement methods of characteristic values in the present invention and the methods for evaluating the effects are as follows.

(1) Thickness of Film

A thickness of a polypropylene film was measured at 10 arbitrary positions in an atmosphere of 23° C. and 65% RH using a contact type electronic micrometer (K-312A type) manufactured by ANRITSU CORPORATION. An arithmetic average value of the thicknesses at the 10 positions was taken as a film thickness (unit: μm) of the polypropylene film.

(2) Thermomechanical Analysis: Temperature (Ts) at which Film Contracts by 0.1% in Longitudinal Direction A polypropylene film was cut into a rectangular sample having a width of 4 mm and a length of 50 mm along the measurement direction (longitudinal direction) of the film as a long side, and the film was pinched by a metal chuck so as to have a test length of 20 mm. The sample pinched by the chuck was set in the following apparatus, and the expansion/contraction curve in the longitudinal direction in the film the load on which was kept constant was obtained by the following temperature program. From the obtained expansion/contraction curve, the temperature at which the film contracts by 0.1% in the longitudinal direction was read, and the average value obtained through measurement with n=3 was taken as (Ts) (unit: ° C.).

Apparatus: Thermomechanical analyzer TMA/SS 6000 (manufactured by Seiko Instruments Inc.)
Test mode: F control mode
Test length: 20 mm
Temperature range: 23 to 200° C.
Heating rate: 10° C./min
Initial load: 3.0 mN
SS program: 0.1 mN/min
Measurement atmosphere: Nitrogen
Measurement thickness: The film thickness of the above (1) was used.

(3) Thermomechanical Analysis: Temperature (Tf) at which Longitudinal Shrink Stress Reaches 0.01 MPa A polypropylene film was cut into a rectangular sample having a width of 4 mm and a length of 50 mm along the measurement direction (longitudinal direction) of the film as a long side, and the film was pinched by a metal chuck so as to have a test length of 20 mm. The sample pinched by the chuck was set in the following apparatus, and the stress curve in the longitudinal direction in the film whose test length was kept constant was obtained by the following temperature program. From the obtained stress curve, the temperature at which the shrink stress reaches 0.01 MPa was read, and the average value obtained through measurement with n=3 was taken as (Tf) (unit: ° C.).

Apparatus: Thermomechanical analyzer TMA/SS 6000 (manufactured by Seiko Instruments Inc.)
Test mode: L control mode
Test length: 20 mm
Temperature range: 23 to 200° C.
Heating rate: 10° C./min
Initial displacement: 0 μm
SS program: 0.1 μm/min
Measurement atmosphere: Nitrogen
Measurement thickness: The film thickness of the above (1) was used.

(4) Degree of Bias, or Skewness, (Ssk) of Protrusion Shape of Surface

Measurement was performed using a scanning white-light interference microscope VS1540 manufactured by Hitachi High-Tech Science Corporation, the undulation component was removed from a shot image by polynomial fourth-order approximation surface correction with the use of attached analysis software, the image was processed with a median (3×3) filter, and interpolation processing (processing of compensating for pixels for which height data fails to be acquired, with height data calculated from surrounding pixels) was then performed. An average value obtained by performing measurement at five arbitrary positions in one plane was calculated. The measurement was performed on both surfaces of the film.

The measurement conditions were as follows.
Manufacturer: Ryoka Systems Inc.
Distributor: Hitachi High-Tech Science Corporation
Apparatus name: Scanning white-light interference microscope VS1540
Measurement conditions: Objective lens 10×
Lens barrel 1×
Zoom lens 1×
Wavelength filter 530 nm white
Measurement mode: Wave
Measurement software: VS-Measure Version 10.0.4.0
Analysis software: VS-Viewer Version 10.0.3.0
Measurement area: 0.561×0.561 mm$^2$.

(5) Meso-Pentad Fraction

For a polypropylene resin in a case of a raw material and a film sample in a case of a film, each was powdered by freeze pulverization, extracted with n-heptane for 2 hours at 60° C. to remove impurities and additives in polypropylene, and then dried under reduced pressure for 2 hours or more at 130° C. The sample was dissolved in a solvent, and the meso-pentad fraction (mmmm) was obtained using $^{13}$C-NMR under the following conditions.

Measurement conditions
Apparatus: DRX-500 manufactured by Bruker Corporation
Measurement nucleus: $^{13}$C nucleus (resonance frequency: 125.8 MHz)
Measurement concentration: 10% by mass
Solvent: benzene:Deuterated ortho-dichlorobenzene=1:3 mixed solution (volume ratio)
Measurement temperature: 130° C.
Spin rotation number: 12 Hz
NMR sample tube: 5-mm tube
Pulse width: 45° (4.5 μs)
Pulse repetition time: 10 seconds
Data point: 64K
Cumulative number: 10,000 times
Measurement mode: complete decoupling
Analysis Conditions Fourier transformation was performed with an LB (line broadening factor) of 1, and the mmmm peak was set to 21.86 ppm. Peak splitting was performed using WINFIT software (manufactured by Bruker Corporation). At that time, the peak splitting was performed from the peak on the high magnetic field side as follows, automatic fitting of the software was further performed to optimize the peak splitting, and then the total of the peak fractions of mmmm was set as the meso-pentad fraction (mmmm).

(1) mrrm
(2) (3) rrrm (divided as two peaks)
(4) rrrr
(5) mrmr
(6) mrmm+rmrr
(7) mmrr
(8) rmmr
(9) mmmr
(10) mmmm The same measurement was performed five times for the same sample, and the average value of the obtained meso-pentad fractions was set as the meso-pentad fraction of the sample.

(6) Molecular Weight and Molecular Weight Distribution of Polypropylene Resin and Film Evaluation and calculation were performed by GPC (gel permeation chromatography) under the following apparatus and measurement conditions. A calibration curve was produced using standard polystyrene manufactured by Tosoh Corporation, and a value of the measured molecular weight was converted into a value of polystyrene to obtain a Z+1 average molecular weight (Mz+1), a weight average molecular weight (Mw), and a number average molecular weight (Mn). Then, the molecular weight distribution (Mz+1/Mw) was determined using the values of Mz+1 and Mw.

As sample pretreatment, a sample was weighed under the following measurement conditions, a solvent (1,2,4-TCB to which 0.1% of BHT was added) was added, and the mixture was shaken at 140° C. for 1 hour to dissolve the sample. Next, heat filtration was performed with a sintered filter having a pore size of 0.5 μm.

<Apparatus and Measurement Conditions>
Apparatus: HLC-8321GPC/HT (detector: RT)
Column: TSKgel guardcolumn $H_{HR}$(30) HT (7.5 mm I.D.×7.5 mm)×1 bottle+TSKgel $GMH_{HR}$-H(20) HT (7.8 mm I.D.×30 cm)×3 bottles (manufactured by Tosoh Corporation)
Eluent: 1,2,4-Trichlorobenzene (for GPC manufactured by FUJIFILM Wako Pure Chemical Corporation)+BHT (0.05%)
Flow rate: 1.0 mL/min.
Detection conditions: polarity=(−)
Injection amount: 0.3 mL
Column temperature: 140° C.
System temperature: 40° C.
Sample concentration: 1 mg/mL (7) Thermal Shrinkage Ratio in Width Direction after Heat Treatment at 125° C. for 15 Minutes 5 samples were cut out, each having a length of 200 mm and a width of 10 mm such that the width direction of the film was the long side, each sample was marked to draw reference lines at positions of 25 mm from both ends, and the distance between the reference lines was measured with a universal projector and defined as a test length (L1. Set 150 mm). Next, a load of 3 g was applied to one end (the lower end) of the test piece in the length direction, the test piece was heated in a suspended state for 15 minutes in an oven maintained at 125° C., the test piece was taken out and cooled at room temperature, a dimension (L2) between the reference lines previously drawn was measured with a universal projector, the thermal shrinkage ratio of each sample was determined by the following formula, and the arithmetic average value of 5 samples was calculated as the thermal shrinkage ratio in the measurement direction.

Thermal shrinkage ratio=$\{(L1-L2)/L1\}\times100$ (unit: %)

(8) Melting Peak Temperature (Tm) and Crystallization Peak Temperature (Tc) of Polypropylene Resin and Film With the use of a differential scanning calorimeter (EXSTAR DSC6220 manufactured by Seiko Instruments Inc.), 3 mg of the polypropylene film in a nitrogen atmosphere is heated from 30° C. to 260° C. under the condition of 20° C./min, then held at 260° C. for 5 minutes, and then cooled to 30° C. under the condition of 20° C./min. The endothermic peak temperature obtained in the heating process was defined as the melting peak temperature of the polypropylene film, and the exothermic peak temperature obtained in the cooling process was defined as the crystallization peak temperature of the polypropylene film. In the present specification, (Tm) and (Tc) were calculated from the average value obtained by measurement with n=3. There is a case where two or more peak temperatures are observed within the temperature range or a case of a peak temperature that can be observed on a multi-stage DSC chart referred to as a shoulder (observed in the case of a chart with two or more peaks overlapped with each other), but in the present invention, the temperatures of peaks with the largest absolute values of vertical axis heat flow (unit: mW) on a DSC chart are respectively regarded as (Tm) and (Tc) (unit of both: ° C.). (Tm) and (Tc) of the polypropylene resin were also measured in the same manner.

(9) Total Volume of Valleys with Depth of 20 nm or More in Film Surface (Total Valley Side Volume)

Measurement was performed using a scanning white-light interference microscope VS1540 manufactured by Hitachi High-Tech Science Corporation, the undulation component was removed from a shot image by polynomial fourth-order approximation surface correction with the use of attached analysis software, the image was processed with a median (3×3) filter, and interpolation processing (processing of compensating for pixels for which height data fails to be acquired, with height data calculated from surrounding pixels) was then performed. Next, analysis was performed using a bearing function, which is an analysis tool of the analysis software. In order to designate a valley-side gap having a depth of 20 nm or more, the valley side height threshold was set to −20 nm in the height region designation. The analyzed valley-side void volume value was then read. The measurement was performed at 5 arbitrary positions in one surface, and the average value was taken as the total volume of valleys having a depth of 20 nm or more on the film surface.

When both surfaces of the film were measured and the total valley side volume fell within the range of 50 to 5,000 μm³, the value of the surface on the side that fell within the range (the value of the surface having a smaller value when both the surfaces are within the range) was given, and when the total valley side volume did not fall within the range on both surfaces, the value of the surface on the side close to the range of 50 to 5,000 μm³ was given. The measurement conditions were the same as in (4) Degree of bias of surface protrusion.

(10) Protrusion Mountain Height on Film Surface (SpkA) and (SpkB)

Measurement was performed using a scanning white-light interference microscope VS1540 manufactured by Hitachi High-Tech Science Corporation, the undulation component was removed from a shot image by polynomial fourth-order approximation surface correction with the use of attached analysis software, the image was processed with a median (3×3) filter, and interpolation processing (processing of compensating for pixels for which height data fails to be acquired, with height data calculated from surrounding pixels) was then performed. Measurement was performed at five arbitrary positions in one plane, and the average value thereof was calculated. Measurement was performed on both surfaces of the film, and the value of the surface having a lower value was defined as SpkA, and the value of the surface on the opposite side was defined as SpkB (unit of both: nm). The measurement conditions were the same as in (4) Degree of bias of surface protrusion.

(11) Film Dielectric Breakdown Voltage (V/μm) in Environment of 130° C.

The film was heated for 1 minute in an oven maintained at 130° C. and then measured in that atmosphere according to Method B (flat plate electrode method) of JIS C 2330

(2001) 7.4.11.2. However, as for the lower electrode, one obtained by placing "Conductive Rubber E-100 <65>" manufactured by TOGAWA RUBBER CO., LTD. having the same dimensions on a metal plate described in Method B of JIS C 2330 (2001) 7.4.11.2 was used as an electrode. A dielectric breakdown voltage test was carried out 30 times. Each obtained value was divided by the thickness of the film (measured in above-mentioned (1)) and converted into the unit of (V/dam). From the measured values (calculated values) of 30 points in total, 5 points in descending order from the maximum value and 5 points in ascending order from the minimum value were excluded, and the average value of the remaining 20 points was taken as the film dielectric breakdown voltage at 130° C.

(12) Cold Xylene Soluble Component (CXS) of Film

For a polypropylene resin sample in the case of a raw material and a film sample in the case of a film, sample of 0.5 g by mass was dissolved in 100 ml of xylene at 135° C. and was allowed to cool, and then recrystallized in a thermostatic water bath for 1 hour at 20° C., and then the polypropylene-based component dissolved in a filtrate was quantified by liquid chromatography. Assuming that the amount of the polypropylene-based component dissolved in the filtrate was set as X (g) and the precise amount value of 0.5 g of the sample was set as X0 (g), CXS was calculated by the following formula.

$$CXS \text{ (\% by mass)} = (X/X0) \times 100$$

(13) Evaluation of Film Capacitor Characteristics (Withstand Voltage, Reliability, and Processability at 120° C.)

Aluminum was deposited on one surface (the surface having the higher wet tension when the wet tension is different between the front and back surfaces) of the film in a vacuum deposition pattern having a film resistance of 10 Ω/sq and what is called a T-shaped margin (longitudinal pitch (period) of 17 mm and fuse width of 0.5 mm due to masking oil) in which a margin portion was provided in a direction perpendicular to the longitudinal direction using a vacuum deposition machine manufactured by ULVAC, Inc. to obtain a deposition reel having a film width of 50 mm (end margin width: 2 mm) after slitting.

Then, using this reel, the capacitor element was wound with an element winding machine (KAW-4 NHB) manufactured by KAIDO MANUFACTURING CO., LTD., subjected to metal spraying, and then subjected to a heat treatment at a temperature of 128° C. for 12 hours under reduced pressure, and a lead wire was attached to finish the capacitor element.

Using the obtained 10 capacitor elements, what is called a step-up test was performed in which a voltage of 250 VDC was applied to the capacitor elements at a high temperature of 120° C., and the applied voltage was gradually increased stepwise at 50 VDC/1 minute after a lapse of 10 minutes at the voltage.

<Evaluation of Withstand Voltage>

In the step-up test, the change in electrostatic capacitance in this test was measured and plotted on the graph, and the voltage at which the capacitance reached 80% of the initial value was divided by the thickness of the film (the above-mentioned (1)) to give a withstand voltage rating and evaluated as follows.

S: 400 V/μm or more
A: 390 V/μm or more and less than 400 V/μm
B: 380 V/μm or more and less than 390 V/μm
C: Less than 380 V/μm Elements judged as S, A, or B are usable. C is inferior in practical performance.

<Evaluation of Reliability>

After increasing the voltage until the electrostatic capacitance decreased to 15% or less with respect to the initial value, the capacitor element was disassembled to examine the state of breakdown, and the reliability was evaluated as follows.

S: There is no change in element shape, and penetrating destruction is not observed.
A: There is no change in element shape, and penetrating destruction of one or more and five or less layers of the film is observed.
B: There is no change in element shape, and penetrating destruction of 6 or more and 10 or less layers of the film is observed.
C: A change in element shape is observed, or penetrating destruction of more than 10 layers is observed.
D: The element shape is greatly changed and destroyed.

In the case of S, it can be used without problems, and in A and B, it can be used depending on conditions. In the case of C and D, it is inferior in practical performance.

<Evaluation of Processability>

The processability was judged on the basis of the following criteria. A capacitor element was produced in the same manner as described above, and the shape of the element was visually observed.

S: The end surface film of the capacitor element is not displaced, wrinkled, or deformed, on a level that does not interfere with the subsequent steps at all.
A: There is no deformation of the capacitor element, and wrinkles are slightly present, but the capacitor element can be used without any problem.
B: Deformation and wrinkles of the capacitor element are slightly observed, but the capacitor element can be used.
C: The capacitor element is severely deformed and wrinkled, on a level that interferes with the subsequent steps.

In the case of S and A, the element can be used without problems, in the case of B, the element can be used depending on conditions, and in the case of C, the element is difficult to put into practical use.

EXAMPLES

Hereinafter, the present invention will be described more specifically with reference to examples.

(Polypropylene Raw Material)

Raw materials shown in Table 1 below were used for production of polypropylene films of examples and comparative examples. These values are values evaluated in the form of raw material resin pellets. Three kinds of raw materials (A1, A2, A3, and A4) were used as a polypropylene raw material A, two kinds of raw materials (B1, B2, and B3) were used as a polypropylene raw material B, and two kinds of raw materials (C1: Ziegler-Natta catalyst system, C2: metallocene catalyst system) were used as a polypropylene raw material C.

Example 1

Raw materials used and the conditions for film formation in the present example are as shown in Tables 1 and 2. First, 92 parts by mass of the polypropylene raw material (A1), 5 parts by mass of the polypropylene raw material (B1), and 3 parts by mass of the polypropylene raw material (C1) were dry-blended, supplied to a uniaxial single-screw extruder at a temperature of 260° C., melted, passed through a pipe set at 255° C. after passing through a filtration filter, and melt-extruded into a sheet from a T-shaped slit die set at 250° C., and the molten sheet was brought into close contact with a casting drum maintained at 95° C. with an air knife, and cooled and solidified to obtain an unstretched polypropylene film. The unstretched polypropylene film was preheated to 142° C. stepwise by a plurality of roll groups, passed between rolls having a circumferential speed difference as it was, preliminarily stretched to 1.08 times at 130° C., and stretched to 6.2 times in the longitudinal direction at 142° C. Subsequently, the film was guided to a tenter, preheated at a temperature of 170° C. (TD stretching temperature+8° C.) with both ends in a film width held by clips, and then stretched to 12.5 times in the width direction at a temperature of 162° C. Furthermore, as a heat treatment and a relaxation treatment at a first stage, a heat treatment was performed at 160° C. while 15% relaxation was applied in the width direction, and as a heat treatment at a second stage, a heat treatment was performed at 150° C. while holding the film with clips in the width direction. Finally, as a heat treatment at a third stage, the film was guided to the outside of the tenter through the heat treatment at 110° C., the clip at the end of the film was released, then a film surface (on the casting drum contact surface side) was subjected to a corona discharge treatment in the atmosphere at a treatment intensity of 25 W·min/m², and a film having a film thickness of 2.1 μm was wound up into a film roll. Characteristics of the polypropylene film and capacitor characteristics of the present example were as shown in Table 4, the relationship between (Ts Tf) and (Ssk) of the film was extremely good, and the withstand voltage, reliability, and processability as a capacitor were also excellent.

Example 2

A polypropylene film having a thickness of 2.4 μm was obtained in the same manner as in Example 1 except that 95 parts by mass of the polypropylene raw material (A1) and 5 parts by mass of the polypropylene raw material (B1) were used as raw materials and that the respective conditions were as shown in Table 2. Characteristics of the polypropylene film and capacitor characteristics of the present example were as shown in Table 4, the relationship between (Ts–Tf) and (Ssk) of the film was extremely good, the reliability and processability as a capacitor were also excellent, and the results of withstand voltage evaluation were good while being inferior to those of the film of Example 1.

Example 3

A polypropylene film having a thickness of 2.1 μm was obtained in the same manner as in Example 1 except that 89 parts by mass of the polypropylene raw material (A2), 10 parts by mass of the polypropylene raw material (B1), and 1 part by mass of the polypropylene raw material (C2) were used as raw materials and that the respective conditions were as shown in Table 2. Characteristics of the polypropylene film and capacitor characteristics of the present example were as shown in Table 4, (Ts–Tf) of the film was good, (Ssk) was extremely good, and the withstand voltage and reliability as a capacitor were excellent. In the evaluation of processability, there was no deformation of the element, but wrinkles were slightly present to the extent that the element could be used without any problem.

Example 4

A polypropylene film having a thickness of 1.9 μm was obtained in the same manner as in Example 1 except that 95 parts by mass of the polypropylene raw material (A2) and 5 parts by mass of the polypropylene raw material (B2) were used as raw materials and that the respective conditions were as shown in Table 2. Characteristics of the polypropylene film and capacitor characteristics of the present example were as shown in Table 4, the relationship between (Ts–Tf) and (Ssk) of the film was good, and the withstand voltage and reliability as a capacitor were excellent. In the evaluation of processability, deformation of the capacitor element and wrinkles were slightly observed to the extent that the element could be used.

Example 5

A polypropylene film having a thickness of 2.5 μm was obtained in the same manner as in Example 1 except that 89 parts by mass of the polypropylene raw material (A3), 8 parts by mass of the polypropylene raw material (B1), and 3 parts by mass of the polypropylene raw material (C1) were used as raw materials and that the respective conditions were as shown in Table 2. Characteristics of the polypropylene film and capacitor characteristics of the present example were as shown in Table 4, (Ts–Tf) of the film was good, (Ssk) was extremely good, and the withstand voltage and reliability as a capacitor were excellent. In the evaluation of processability, no displacement, wrinkle, or deformation of the end surface film of the capacitor element was observed.

Example 6

A polypropylene film having a thickness of 3.1 μm was obtained in the same manner as in Example 1 except that 90 parts by mass of the polypropylene raw material (A3) and 10 parts by mass of the polypropylene raw material (B2) were used as raw materials and that the respective conditions were as shown in Table 2. Characteristics of the polypropylene film and capacitor characteristics of the present example were as shown in Table 4, the relationship between (Ts–Tf) and (Ssk) of the film was good, and the withstand voltage and reliability as a capacitor were at a practically acceptable level while being inferior to those of the films of Examples 1 to 5. In the evaluation of processability, no displacement, wrinkle, or deformation of the end surface film of the capacitor element was observed.

Example 7

A polypropylene film having a thickness of 2.4 μm was obtained in the same manner as in Example 1 except that 82 parts by mass of the polypropylene raw material (A1), 15 parts by mass of the polypropylene raw material (B1), and 3 parts by mass of the polypropylene raw material (C2) were used as raw materials and that the respective conditions were as shown in Table 2. Characteristics of the polypropylene film and capacitor characteristics of the present example were as shown in Table 4, the relationship between (Ts–Tf) and (Ssk) of the film was good, and the ratings of the withstand voltage and reliability of a capacitor were extremely good. In the evaluation of processability, there was no deformation of the capacitor element, but wrinkles were slightly present to the extent that the element could be used without any problem.

Example 8

A polypropylene film having a thickness of 4.8 μm was obtained in the same manner as in Example 1 except that 92 parts by mass of the polypropylene raw material (A1), 5 parts by mass of the polypropylene raw material (B2), and 3 parts by mass of the polypropylene raw material (C1) were used as raw materials and that the respective conditions were as shown in Table 2. Characteristics of the polypropylene film and capacitor characteristics of the present example were as shown in Table 4, the relationship between (Ts−Tf) and (Ssk) of the film was good, the rating of the withstand voltage as a capacitor was at a practically acceptable level, and the rating of the reliability was good. In the evaluation of processability, no displacement, wrinkle, or deformation of the end surface film of the capacitor element was observed.

Example 9

A polypropylene film having a thickness of 2.2 μm was obtained in the same manner as in Example 1 except that 74 parts by mass of the polypropylene raw material (A4), 25 parts by mass of the polypropylene raw material (B1), and 1 part by mass of the polypropylene raw material (C2) were used as raw materials and that the respective conditions were as shown in Table 2. Characteristics of the polypropylene film and capacitor characteristics of the present example were as shown in Table 4, the relationship between (Ts−Tf) and (Ssk) of the film was good, the rating of the withstand voltage as a capacitor was at a level with no problem in practical use, and the rating of the reliability was good. In the evaluation of processability, there was no deformation of the capacitor element, but wrinkles were slightly present to the extent that the element could be used without any problem.

Comparative Example 1

A polypropylene film having a thickness of 2.2 μm was obtained in the same manner as in Example 1 except that 40 parts by mass of the polypropylene raw material (A3) and 60 parts by mass of the polypropylene raw material (B2) were used as raw materials and that the respective conditions were as shown in Table 3. Characteristics of the polypropylene film and capacitor characteristics of the present example were as shown in Table 5, (Ts−Tf) of the film was out of the preferable range in claim 1, the ratings of the withstand voltage and processability as a capacitor were at a level with no problem in practical use, but the rating of the reliability was at a level at which the capacitor was difficult to put to practical use because changes in the element shape and penetrating destruction of more than 10 layers were observed.

Comparative Example 2

A polypropylene film having a thickness of 3.3 μm was obtained in the same manner as in Example 1 except that 90 parts by mass of the polypropylene raw material (B1) and 10 parts by mass of the polypropylene raw material (C1) were used as raw materials and that the respective conditions were as shown in Table 3. Characteristics of the polypropylene film and capacitor characteristics of the present example were as shown in Table 5, (Ts−Tf of the film was out of the preferable range in claim 1, the ratings of the processability and reliability of a capacitor were at a level with no problem in use, but the rating of the withstand voltage of the capacitor was inferior in practical performance.

Comparative Example 3

A polypropylene film having a thickness of 2.4 μm was obtained in the same manner as in Example 1 except that 20 parts by mass of the polypropylene raw material (A2) and 80 parts by mass of the polypropylene raw material (B2) were used as raw materials and that the respective conditions were as shown in Table 3. Characteristics of the polypropylene film and capacitor characteristics of the present example were as shown in Table 5, (Ts−Tf) of the film was good, (Ssk) was out of the preferable range in claim 1, the rating of the withstand voltage of a capacitor was good, but in the evaluation of the reliability, the element shape was greatly changed, and the element was unusable.

Comparative Example 4

A polypropylene film having a thickness of 2.1 μm was obtained in the same manner as in Example 1 except that 30 parts by mass of the polypropylene raw material (A1) and 70 parts by mass of the polypropylene raw material (B1) were used as raw materials and that the respective conditions were as shown in Table 3. Characteristics of the polypropylene film and capacitor characteristics of the present example were as shown in Table 5, (T)−Tf) of the film was good, (Ssk) was out of the preferable range in claim 1, the processability of a capacitor was at a level with no problem in use, the rating of the reliability was good, but the rating of the withstand voltage of the capacitor was at a level at which the capacitor was difficult to put to practical use.

Comparative Example 5

A polypropylene film having a thickness of 2.4 μm was obtained in the same manner as in Example 1 except that 90 parts by mass of the polypropylene raw material (A1) and 10 parts by mass of the polypropylene raw material (B3) were used as raw materials and that the respective conditions were as shown in Table 3. Characteristics of the polypropylene film and capacitor characteristics of the present example were as shown in Table 5, (Ssk) of the film was out of the preferable range in claim 1, the ratings of the withstand voltage and reliability as a capacitor were at a level with no problem in practical use, but in the evaluation of the processability, the capacitor element was severely deformed and wrinkled, on a level that interfered with the subsequent steps.

Comparative Example 6

A polypropylene film having a thickness of 2.1 μm was obtained in the same manner as in Example 1 except that 40 parts by mass of the polypropylene raw material (A4), 40 parts by mass of the polypropylene raw material (B2), and 20 parts by mass of the polypropylene raw material (C2) were used as raw materials and that the respective conditions were as shown in Table 3. Characteristics of the polypropylene film and capacitor characteristics of the present example were as shown in Table 5, (Ts−Tf) of the film was out of the preferable range in claim 1, the ratings of the processability and reliability of a capacitor were at a level with no problem in use, but the rating of the withstand voltage of the capacitor was inferior in practical performance.

TABLE 1

|  |  | Polypropylene raw material A | | | | Polypropylene raw material B | | | Polypropylene raw material C | |
|---|---|---|---|---|---|---|---|---|---|---|
|  |  | A1 | A2 | A3 | A4 | B1 | B2 | B3 | C1 | C2 |
| Number average molecular weight Mn | (—) | 6.2E+04 | 6.4E+04 | 5.8E+04 | 6.5E+04 | 8.8E+04 | 8.2E+04 | 9.0E+04 | 5.5E+04 | 5.8E+04 |
| Z + 1 average molecular weight Mz + 1 | (—) | 2.2E+06 | 2.4E+06 | 1.4E+06 | 2.6E+06 | 4.0E+06 | 3.5E+06 | 5.0E+06 | 1.6E+06 | 1.2E+06 |
| Meso-pentad fraction | (—) | 0.984 | 0.982 | 0.980 | 0.975 | 0.974 | 0.941 | 0.960 |  |  |
| Chip melting point | (° C.) | 168 | 166 | 167 | 167 | 166 | 164 | 162 | 166 | 155 |
| CXS | (% by mass) | 0.8 | 1.2 | 1.7 | 0.8 | 0.8 | 3.3 | 2.1 | 2.8 | 1.4 |
| Melt tension at 230° C. | (cN) |  |  |  |  |  |  |  | 7.2 | 17.0 |

TABLE 2

|  |  |  |  | Example 1 | Example 2 | Example 3 | Example 4 | Example 5 | Example 6 | Example 7 | Example 8 | Example 9 |
|---|---|---|---|---|---|---|---|---|---|---|---|---|
| Raw material | Polypropylene raw material A | A1 | (Parts by mass) | 92 | 95 | 0 | 0 | 0 | 0 | 82 | 92 | 0 |
|  |  | A2 | (Parts by mass) | 0 | 0 | 89 | 95 | 0 | 0 | 0 | 0 | 0 |
|  |  | A3 | (Parts by mass) | 0 | 0 | 0 | 0 | 89 | 90 | 0 | 0 | 0 |
|  |  | A4 | (Parts by mass) | 0 | 0 | 0 | 0 | 0 | 0 | 0 | 0 | 74 |
|  | Polypropylene raw material B | B1 | (Parts by mass) | 5 | 5 | 10 | 0 | 8 | 0 | 15 | 0 | 25 |
|  |  | B2 | (Parts by mass) | 0 | 0 | 0 | 5 | 0 | 10 | 0 | 5 | 0 |
|  |  | B3 | (Parts by mass) | 0 | 0 | 0 | 0 | 0 | 0 | 0 | 0 | 0 |
|  | Polypropylene raw material C | C1 | (Parts by mass) | 3 | 0 | 0 | 0 | 3 | 0 | 0 | 3 | 0 |
|  |  | C2 | (Parts by mass) | 0 | 0 | 1 | 0 | 0 | 0 | 3 | 0 | 1 |
| Casting step | Casting drum temperature | | (° C.) | 95 | 75 | 95 | 62 | 98 | 80 | 90 | 95 | 97 |
| Longitudinal stretching step | Longitudinal preliminary stretch ratio | | (Times) | 1.08 | 1.08 | 1.05 | 1.10 | 1.04 | 1.03 | 1.08 | 1.05 | 1.10 |
|  | Longitudinal preliminary stretch temperature | | (° C.) | 130 | 135 | 128 | 120 | 138 | 138 | 125 | 125 | 140 |
|  | Longitudinal stretch ratio | | (Times) | 6.2 | 6.3 | 6.4 | 6.5 | 5.8 | 6.0 | 5.3 | 5.8 | 6.2 |
|  | Longitudinal stretch temperature | | (° C.) | 142 | 144 | 140 | 130 | 145 | 148 | 142 | 146 | 145 |
| Lateral stretching step | Lateral stretch ratio | | (Times) | 12.5 | 12.2 | 11.8 | 11.5 | 12.0 | 11.8 | 12.2 | 12.4 | 12.8 |
|  | Area stretch ratio | | (Times) | 78 | 77 | 76 | 75 | 70 | 71 | 65 | 72 | 79 |
|  | TD preheating temperature | | (° C.) | 170 | 175 | 172 | 178 | 176 | 178 | 175 | 174 | 172 |
|  | TD stretch temperature | | (° C.) | 162 | 160 | 159 | 163 | 165 | 158 | 162 | 165 | 165 |
|  | Heat treatment temperature at first stage | | (° C.) | 160 | 158 | 158 | 155 | 158 | 155 | 158 | 157 | 158 |
|  | Heat treatment temperature at second stage | | (° C.) | 150 | 148 | 145 | 147 | 145 | 142 | 145 | 142 | 148 |
|  | Heat treatment temperature at third stage | | (° C.) | 110 | 114 | 100 | 105 | 112 | 104 | 100 | 107 | 105 |
|  | Relaxation ratio | | (%) | 15 | 12 | 10 | 8 | 12 | 10 | 15 | 12 | 15 |
| Thickness of film | | | (μm) | 2.1 | 2.4 | 2.1 | 1.9 | 2.5 | 3.1 | 2.4 | 4.8 | 2.2 |

TABLE 3

| | | | | Comparative Example 1 | Comparative Example 2 | Comparative Example 3 | Comparative Example 4 | Comparative Example 5 | Comparative Example 6 |
|---|---|---|---|---|---|---|---|---|---|
| Raw material | Polypropylene raw material A | A1 | (Parts by mass) | 0 | 0 | 0 | 30 | 90 | 0 |
| | | A2 | (Parts by mass) | 0 | 0 | 20 | 0 | 0 | 0 |
| | | A3 | (Parts by mass) | 40 | 0 | 0 | 0 | 0 | 0 |
| | | A4 | (Parts by mass) | 0 | 0 | 0 | 0 | 0 | 40 |
| | Polypropylene raw material B | B1 | (Parts by mass) | 0 | 90 | 0 | 70 | 0 | 0 |
| | | B2 | (Parts by mass) | 60 | 0 | 80 | 0 | 0 | 40 |
| | | B3 | (Parts by mass) | 0 | 0 | 0 | 0 | 10 | 0 |
| | Polypropylene raw material C | C1 | (Parts by mass) | 0 | 10 | 0 | 0 | 0 | 0 |
| | | C2 | (Parts by mass) | 0 | 0 | 0 | 0 | 0 | 20 |
| Casting step | Casting drum temperature | | (° C.) | 94 | 98 | 64 | 100 | 25 | 98 |
| Longitudinal stretching step | Longitudinal preliminary stretch ratio | | (Times) | — | — | — | — | — | — |
| | Longitudinal preliminary stretch temperature | | (° C.) | — | — | — | — | — | — |
| | Longitudinal stretch ratio | | (Times) | 5.3 | 5.4 | 7.2 | 6.0 | 6.2 | 5.1 |
| | Longitudinal stretch temperature | | (° C.) | 138 | 145 | 140 | 150 | 121 | 142 |
| Lateral stretching step | Lateral stretch ratio | | (Times) | 8.8 | 10.2 | 7.7 | 9.5 | 11.8 | 8.6 |
| | Area stretch ratio | | (Times) | 47 | 55 | 55 | 57 | 73 | 44 |
| | TD preheating temperature | | (° C.) | 172 | 178 | 175 | 180 | 170 | 170 |
| | TD stretch temperature | | (° C.) | 168 | 166 | 165 | 168 | 159 | 165 |
| | Heat treatment temperature at first stage | | (° C.) | 140 | 150 | 140 | 155 | 155 | 150 |
| | Heat treatment temperature at second stage | | (° C.) | 100 | 120 | 120 | 100 | 140 | 110 |
| | Heat treatment temperature at third stage | | (° C.) | 100 | 120 | 120 | 100 | 110 | 110 |
| | Relaxation ratio | | (%) | 8 | 4 | 12 | 15 | 9 | 8 |
| Thickness of film | | | (μm) | 2.2 | 3.3 | 2.4 | 2.1 | 2.4 | 2.1 |

TABLE 4

| | | | Example 1 | Example 2 | Example 3 | Example 4 | Example 5 |
|---|---|---|---|---|---|---|---|
| Raw material characteristics of film | Meso-pentad fraction | (—) | 0.983 | 0.984 | 0.982 | 0.981 | 0.975 |
| | CXS | (% by mass) | 0.9 | 0.8 | 1.0 | 1.3 | 1.9 |
| Molecular weight distribution of film | Mz + 1/Mw | (—) | 5.8 | 5.7 | 6.2 | 6.6 | 7.1 |
| Thermal characteristics of film | Melting peak temperature (Tm) | (° C.) | 175 | 175 | 174 | 173 | 172 |
| | Crystallization peak temperature (Tc) | (° C.) | 116 | 110 | 118 | 108 | 115 |
| | (Tm − Tc) | (° C.) | 59 | 65 | 56 | 65 | 57 |
| | (Ts) in longitudinal direction | (° C.) | 145 | 146 | 144 | 138 | 126 |
| | (Tf) in longitudinal direction | (° C.) | 135 | 136 | 132 | 125 | 105 |

TABLE 4-continued

|  |  |  |  |  |  |  |  |
|---|---|---|---|---|---|---|---|
|  | (Ts − Tf) | (° C.) | 10 | 10 | 12 | 13 | 21 |
|  | Thermal shrinkage ratio in width direction after heat treatment at 125° C. for 15 minutes | (%) | 0.4 | 0.4 | 0.5 | 0.6 | 1.0 |
| Surface of film | Degree of bias, or skewness, (Ssk) of protrusion shape of surface A | (—) | 2 | −3 | 8 | 18 | −5 |
|  | Degree of bias, or skewness, (Ssk) of protrusion shape of surface B | (—) | −15 | −22 | −10 | 4 | −26 |
|  | Protrusion mountain height (SpkA) of surface A | (nm) | 45 | 64 | 38 | 22 | 72 |
|  | Protrusion mountain height (SpkB) of surface B | (nm) | 104 | 127 | 82 | 67 | 125 |
|  | Volume of valleys with depth of 20 nm or more | (μm³) | 2854 | 3476 | 2675 | 1022 | 3217 |
| Electrical characteristics of film | Dielectric breakdown voltage of film in environment of 130° C. | (V/μm) | 432 | 425 | 411 | 420 | 407 |
| Evaluation of film capacitor element | Rating of withstand voltage | (—) | S | A | A | S | A |
|  | Rating of reliability | (—) | S | S | S | A | A |
|  | Rating of processability | (—) | S | S | A | B | S |

|  |  |  | Example 6 | Example 7 | Example 8 | Example 9 |
|---|---|---|---|---|---|---|
| Raw material characteristics of film | Meso-pentad fraction | (—) | 0.979 | 0.982 | 0.981 | 0.975 |
|  | CXS | (% by mass) | 2.2 | 1.1 | 1.2 | 0.9 |
| Molecular weight distribution of film | Mz + 1/Mw | (—) | 7.1 | 6.1 | 6.6 | 7.6 |
| Thermal characteristics of film | Melting peak temperature (Tm) | (° C.) | 171 | 174 | 172 | 168 |
|  | Crystallization peak temperature (Tc) | (° C.) | 105 | 118 | 115 | 115 |
|  | (Tm − Tc) | (° C.) | 66 | 56 | 57 | 53 |
|  | (Ts) in longitudinal direction | (° C.) | 108 | 140 | 136 | 112 |
|  | (Tf) in longitudinal direction | (° C.) | 90 | 128 | 114 | 98 |
|  | (Ts − Tf) | (° C.) | 22 | 18 | 35 | 14 |
|  | Thermal shrinkage ratio in width direction after heat treatment at 125° C. for 15 minutes | (%) | 0.8 | 0.5 | 1.2 | 0.3 |
| Surface of film | Degree of bias, or skewness, (Ssk) of protrusion shape of surface A | (—) | −15 | −2 | −1 | −8 |
|  | Degree of bias, or skewness, (Ssk) of protrusion shape of surface B | (—) | −29 | −12 | −22 | −28 |
|  | Protrusion mountain height (SpkA) of surface A | (nm) | 92 | 54 | 58 | 72 |
|  | Protrusion mountain height (SpkB) of surface B | (nm) | 149 | 114 | 125 | 125 |
|  | Volume of valleys with depth of 20 nm or more | (μm³) | 4885 | 3428 | 4018 | 3855 |
| Electrical characteristics of film | Dielectric breakdown voltage of film in environment of 130° C. | (V/μm) | 372 | 382 | 353 | 351 |
| Evaluation of film capacitor element | Rating of withstand voltage | (—) | B | A | B | B |
|  | Rating of reliability | (—) | B | S | A | A |
|  | Rating of processability | (—) | A | A | S | A |

TABLE 5

|  |  |  | Comparative Example 1 | Comparative Example 2 | Comparative Example 3 |
|---|---|---|---|---|---|
| Raw material characteristics of film | Meso-pentad fraction | (—) | 0.962 | 0.970 | 0.948 |
|  | CXS | (% by mass) | 2.7 | 1.0 | 3.0 |
| Molecular weight distribution of film | Mz + 1/Mw | (—) | 7.8 | 9.1 | 8.2 |
| Thermal characteristics of film | Melting peak temperature (Tm) | (° C.) | 170 | 171 | 168 |
|  | Crystallization peak temperature (Tc) | (° C.) | 104 | 118 | 106 |
|  | (Tm − Tc) | (° C.) | 66 | 53 | 62 |
|  | (Ts) in longitudinal direction | (° C.) | 132 | 144 | 98 |
|  | (Tf) in longitudinal direction | (° C.) | 90 | 103 | 80 |
|  | (Ts − Tf) | (° C.) | 42 | 41 | 18 |
|  | Thermal shrinkage ratio in width direction after heat treatment at 125° C. for 15 minutes | (%) | 2.8 | 2.4 | 0.8 |
| Surface of film | Degree of bias, or skewness, (Ssk) of protrusion shape of surface A | (—) | −18 | −28 | 24 |
|  | Degree of bias, or skewness, (Ssk) of protrusion shape of surface B | (—) | −44 | −56 | 8 |
|  | Protrusion mountain height (SpkA) of surface A | (nm) | 108 | 125 | 18 |
|  | Protrusion mountain height (SpkB) of surface B | (nm) | 160 | 178 | 48 |
|  | Volume of valleys with depth of 20 nm or more | (μm³) | 6592 | 7106 | 2082 |
| Electrical characteristics of film | Dielectric breakdown voltage of film in environment of 130° C. | (V/μm) | 358 | 340 | 406 |
| Evaluation of film capacitor element | Rating of withstand voltage | (—) | B | C | A |
|  | Rating of reliability | (—) | C | B | D |
|  | Rating of processability | (—) | B | A | C |

|  |  |  | Comparative Example 4 | Comparative Example 5 | Comparative Example 6 |
|---|---|---|---|---|---|
| Raw material characteristics of film | Meso-pentad fraction | (—) | 0.978 | 0.980 | 0.952 |
|  | CXS | (% by mass) | 0.8 | 1.0 | 2.1 |
| Molecular weight distribution of film | Mz + 1/Mw | (—) | 8.8 | 6.0 | 7.6 |
| Thermal characteristics of film | Melting peak temperature (Tm) | (° C.) | 173 | 174 | 165 |
|  | Crystallization peak temperature (Tc) | (° C.) | 106 | 105 | 118 |
|  | (Tm − Tc) | (° C.) | 67 | 69 | 47 |
|  | (Ts) in longitudinal direction | (° C.) | 124 | 116 | 132 |
|  | (Tf) in longitudinal direction | (° C.) | 95 | 92 | 91 |
|  | (Ts − Tf) | (° C.) | 29 | 24 | 41 |
|  | Thermal shrinkage ratio in width direction after heat treatment at 125° C. for 15 minutes | (%) | 1.5 | 2.6 | 2.8 |
| Surface of film | Degree of bias, or skewness, (Ssk) of protrusion shape of surface A | (—) | −32 | 26 | −18 |
|  | Degree of bias, or skewness, (Ssk) of protrusion shape of surface B | (—) | −48 | 18 | −32 |

TABLE 5-continued

| | | | | | |
|---|---|---|---|---|---|
| | Protrusion mountain height (SpkA) of surface A | (nm) | 131 | 11 | 101 |
| | Protrusion mountain height (SpkB) of surface B | (nm) | 168 | 28 | 152 |
| | Volume of valleys with depth of 20 nm or more | (µm³) | 7658 | 168 | 5032 |
| Electrical characteristics of film | Dielectric breakdown voltage of film in environment of 130° C. | (V/µm) | 338 | 418 | 342 |
| Evaluation of film capacitor element | Rating of withstand voltage | (—) | C | A | C |
| | Rating of reliability | (—) | A | B | B |
| | Rating of processability | (—) | B | C | A |

The polypropylene film of the present invention is excellent in structural stability against heat and also excellent in withstand voltage characteristics in a high temperature environment and thus can be suitably used for a film capacitor by being formed into a metal membrane layered film. In addition, the film capacitor using this is excellent in withstand voltage characteristics and reliability and can be suitably used for vehicles such as automobiles, various electric appliances, and the like.

The invention claimed is:

1. A polypropylene film wherein, in a heating process in thermomechanical analysis (TMA), a relationship (Ts−Tf) ≤40° C. is satisfied by a temperature (Ts) (° C.) at which the film contracts by 0.1% in a longitudinal direction and a temperature (Tf) (C) at which a longitudinal shrink stress reaches 0.01 MPa; and a skewness (Ssk), which is a degree of bias of a protrusion shape, of at least one surface of the film is greater than −30 and less than 5.

2. The polypropylene film according to claim 1, wherein the temperature (Tf) (C) at which the longitudinal shrink stress reaches 0.01 MPa in the heating process in thermomechanical analysis (TMA) is 100° C. or higher.

3. The polypropylene film according to claim 1, having a thermal shrinkage ratio in a width direction of 1.0% or less after heat treatment at 125° C. for 15 minutes.

4. The polypropylene film according to claim 1, wherein a relationship (Tm−Tc)≤65° C. is satisfied by a melting peak temperature (Tm) (C) of a film obtained by heating the film from 30° C. to 260° C. at 20° C./min with a differential scanning calorimeter DSC, and a crystallization peak temperature (Tc) (° C.) of the film obtained by lowering a temperature from 260° ° C. to 30° C. at 20° C./min after the heating.

5. The polypropylene film according to claim 1, wherein a melting peak temperature (Tm) (C) obtained by heating the film from 30° ° C. to 260° C. at 20° C./min with the differential scanning calorimeter DSC is 170° C. or higher.

6. The polypropylene film according to claim 1, wherein, when one surface is a surface A and another surface is a surface B, a protrusion mountain height (SpkA) (nm) of the surface A and a protrusion mountain height (SpkB) (nm) of the surface B satisfy following relationships:

SpkA <SpkB;
20 nm≤SpkA≤100 nm; and
80 nm≤SpkB≤150 nm.

7. The polypropylene film according to claim 1, wherein a total valley side volume, which is the total volume of valleys having a depth of 20 nm or more in a region of 0.561×0.561 mm², on at least one surface of the film, is 50 to 5,000 µm³.

8. A metal layer laminated film comprising a metal membrane on at least one surface of the polypropylene film according to claim 1.

9. A film capacitor comprising the metal layer laminated film according to claim 8.

* * * * *

UNITED STATES PATENT AND TRADEMARK OFFICE
CERTIFICATE OF CORRECTION

PATENT NO. : 12,020,871 B2
APPLICATION NO. : 17/799322
DATED : June 25, 2024
INVENTOR(S) : Yasuyuki Imanishi et al.

It is certified that error appears in the above-identified patent and that said Letters Patent is hereby corrected as shown below:

On the Title Page

Item (56) under the heading OTHER PUBLICATIONS, Line 4: -- Publication -- should read -- Publications --

In the Claims

Column 41, Claim 1, Line 31: -- (C) -- should read -- (° C.) --

Column 41, Claim 2, Line 36: -- (C) -- should read -- (° C.) --

Column 41, Claim 4, Line 44: -- (C) -- should read -- (° C.) --

Column 42, Claim 4, Line 20: -- 260° ° -- should read -- 260° --

Column 42, Claim 5, Line 23: -- (C) -- should read -- (° C.) --

Column 42, Claim 5, Line 24: -- 30° ° -- should read -- 30° --

Signed and Sealed this
Third Day of September, 2024

Katherine Kelly Vidal
*Director of the United States Patent and Trademark Office*